(12) United States Patent
Minor et al.

(10) Patent No.: US 10,035,940 B2
(45) Date of Patent: Jul. 31, 2018

(54) COMPOSITIONS COMPRISING TETRAFLUOROPROPENE AND METHODS OF USE THEREOF

(71) Applicant: THE CHEMOURS COMPANY FC, LLC, Wilmington, DE (US)

(72) Inventors: Barbara Haviland Minor, Elkton, MD (US); Joachim Gerstel, Hessen (DE)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

(21) Appl. No.: 15/901,359

(22) Filed: Feb. 21, 2018

(65) Prior Publication Data

US 2018/0179428 A1    Jun. 28, 2018

Related U.S. Application Data

(62) Division of application No. 15/610,479, filed on May 31, 2017, now Pat. No. 9,932,507, which is a division of application No. 14/974,028, filed on Dec. 18, 2015, now abandoned, which is a division of application No. 14/240,038, filed as application No. PCT/US2012/052277 on Aug. 24, 2012, now Pat. No. 9,249,347.

(60) Provisional application No. 61/527,829, filed on Aug. 26, 2011, provisional application No. 61/621,023, filed on Apr. 6, 2012.

(51) Int. Cl.
| | |
|---|---|
| C09K 5/04 | (2006.01) |
| B01F 17/00 | (2006.01) |
| C10M 171/00 | (2006.01) |
| F25B 45/00 | (2006.01) |
| F25B 39/02 | (2006.01) |
| C09K 3/30 | (2006.01) |

(52) U.S. Cl.
CPC .......... C09K 5/045 (2013.01); B01F 17/0085 (2013.01); C09K 3/30 (2013.01); C10M 171/008 (2013.01); F25B 39/02 (2013.01); F25B 45/00 (2013.01); C09K 2205/122 (2013.01); C09K 2205/126 (2013.01); C09K 2205/22 (2013.01); C09K 2205/40 (2013.01); C09K 2205/43 (2013.01)

(58) Field of Classification Search
CPC .............. C09K 5/045; C09K 2205/22; C09K 2205/43; F25B 39/02; F25B 45/00
USPC ........................... 252/67, 68, 69; 62/77, 119
See application file for complete search history.

(56) References Cited

U.S. PATENT DOCUMENTS

| | | | |
|---|---|---|---|
| 5,986,151 A | 11/1999 | Van Der Puy | |
| 7,524,805 B2 | 4/2009 | Singh et al. | |
| 9,249,347 B2 | 2/2016 | Minor et al. | |
| 9,683,157 B2 | 6/2017 | Rached | |
| 9,879,165 B2 * | 1/2018 | Minor | C09K 5/045 |
| 2006/0243944 A1 | 11/2006 | Minor et al. | |
| 2008/0230738 A1 | 9/2008 | Minor et al. | |
| 2010/0122545 A1 | 5/2010 | Minor et al. | |
| 2011/0084228 A1 | 4/2011 | Rached | |
| 2011/0184890 A1 | 7/2011 | Low | |
| 2011/0186772 A1 | 8/2011 | Rached | |
| 2011/0258147 A1 | 10/2011 | Low | |
| 2012/0126187 A1 | 5/2012 | Low | |
| 2012/0161064 A1 | 6/2012 | Rached | |
| 2012/0267564 A1 | 10/2012 | Leck et al. | |
| 2013/0055739 A1 | 3/2013 | Rached | |
| 2014/0264147 A1 * | 9/2014 | Yana Motta | C09K 5/045 |
| | | | 252/68 |
| 2016/0046850 A1 * | 2/2016 | Yana Motta | C09K 5/045 |
| | | | 252/67 |
| 2016/0238295 A1 * | 8/2016 | Sethi | C09K 5/045 |
| 2016/0244651 A1 * | 8/2016 | Leck | C09K 5/045 |
| 2017/0145276 A1 | 5/2017 | Rached | |
| 2017/0218242 A1 | 8/2017 | Rached | |

FOREIGN PATENT DOCUMENTS

| | | |
|---|---|---|
| KR | 20120128585 A | 11/2012 |
| WO | 2010/000994 A2 | 1/2010 |
| WO | 2010/000995 A2 | 1/2010 |

(Continued)

OTHER PUBLICATIONS

Luca Bonomelli, Authorized Officer, PCT International Search Report and Written Opinion for Application No. PCT/US2012/052277, dated May 15, 2013.

(Continued)

*Primary Examiner* — Douglas J Mc Ginty
(74) *Attorney, Agent, or Firm* — N. Lynn Tucker

(57) ABSTRACT

The present invention relates to a composition comprising HFO-1234yf, or trans-HFO-1234ze, or a mixture thereof; HFC-32; and HFC-152a, HFO-1243zf, or a mixture thereof, wherein said composition is selected from the group consisting of:

(I) a first composition, wherein said HFO-1234yf or trans-HFO-1234ze or a mixture thereof is at least 56 weight percent of said first composition;

(II) a second composition, wherein said HFC-32 is at most 29 weight percent of said second composition;

(III) a third composition, wherein said HFC-152a is at least 56 weight percent said third composition;

(IV) a fourth composition, wherein said HFC-32 is at least 56 weight percent of said fourth composition;

(V) a fifth composition comprising trans-HFO-1234ze, HFC-32, and HFC-152a, HFO-1243zf, or a mixture thereof; and (VI) a sixth composition, wherein said HFO-1243zf or mixture thereof with HFC-152a is at most 20 weight percent of said sixth composition.

15 Claims, 1 Drawing Sheet

(56) References Cited

FOREIGN PATENT DOCUMENTS

| WO | 2010/064005 A1 | 6/2010 |
| WO | 2010/119265 A1 | 10/2010 |
| WO | 2011/141656 A2 | 11/2011 |

OTHER PUBLICATIONS

Yukihiro Higashi, Thermophysical Properties of HFO-1234yf and HFO-1234ze(E), International Symposium on Next-generation Air Conditioning and Refrigeration Technology, Feb. 17-19, 2010, Tokyo, Japan.

IPCC, 2007: Climate Change 2007 The Physical Science Basis. Contribution of Working Group I to the Fourth Assessment Report of the Intergovernmental Panel on Climate Change, Chapter 2, pp. 212-213, Table 2.142, Cambridge University Press, Cambridge, United Kingdom and New York, NY.

M. S. Javadi, et al., Atmospheric chemistry of trans-$CF_3CH=CHF$: products and mechanisms of hydroxyl radical and chlorine atom initiated oxidation, Atmos. Chem. Phys, 2008, pp. 3141-3147, vol. 8.

Vassileios C. Papadimitriou, et al., $CF_3CFQCH_2$ and (Z)-$CF_3CFQCHF$: temperature dependent OH rate coefficients and global warming potentials, Physical Chemistry Chemical Physics, 2007, pp. 1-13, vol. 9.

PCT International Search Report and Written Opinion for PCT/US2012/052277 dated May 15, 2013.

\* cited by examiner

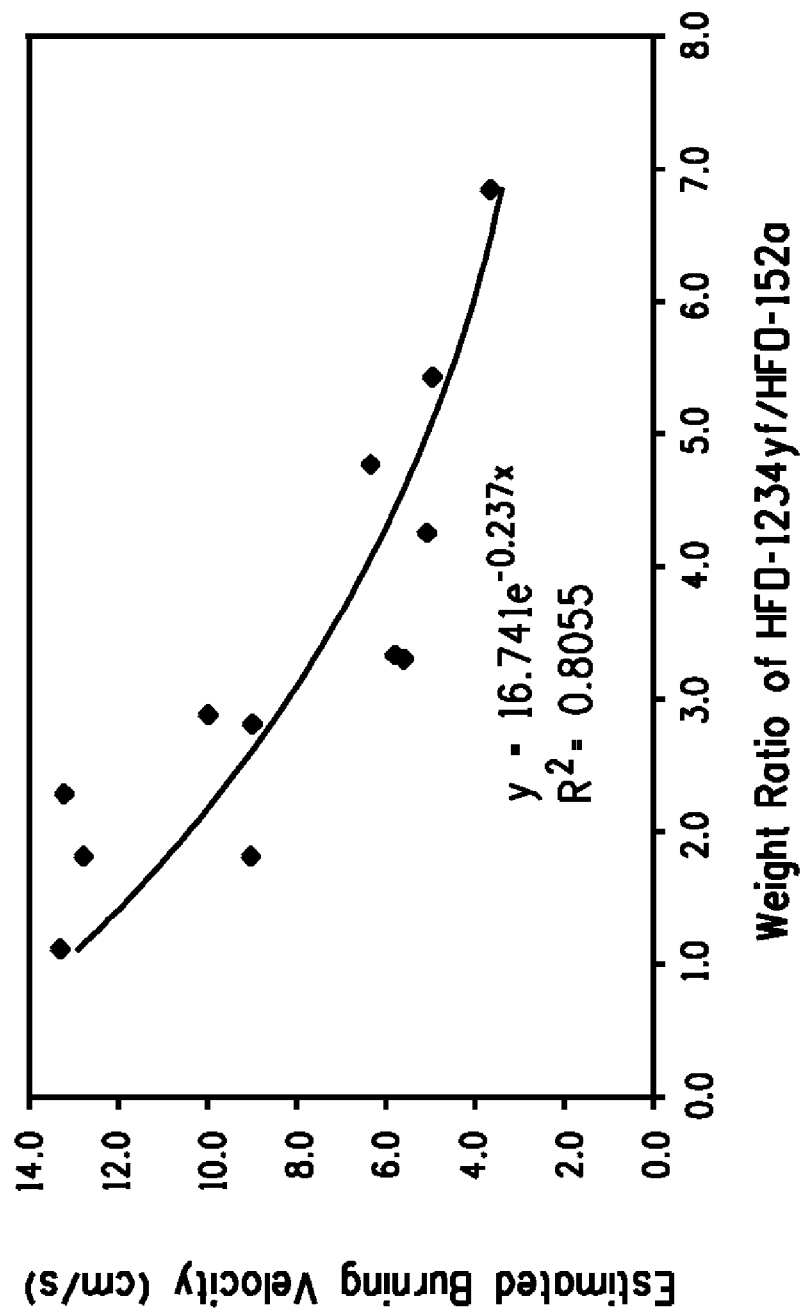

COMPOSITIONS COMPRISING TETRAFLUOROPROPENE AND METHODS OF USE THEREOF

BACKGROUND

1. Field of the Disclosure

The present disclosure relates to compositions comprising 2,3,3,3-tetrafluoropropene (HFO-1234yf) or 1,3,3,3-tetrafluoropropene (trans-HFO-1234ze) or a mixture thereof; difluoromethane (HFC-32); and 1,1, difluoroethane (HFC-152a), 3,3,3-trifluoropropene (HFO-1243zf) or mixture thereof.

The compositions of the present invention are useful in processes for producing cooling or heat, as heat transfer fluids, foam blowing agents, aerosol propellants, and as power cycle working fluids.

2. Description of Related Art

The refrigeration industry has been working for the past few decades to find replacement refrigerants for the ozone-depleting chlorofluorocarbons (CFCs) and hydrochlorofluorocarbons (HCFCs). CFCs and the HCFCs are being phased out as a result of the Montreal Protocol. The solution for most refrigerant producers has been the commercialization of hydrofluorocarbon (HFC) refrigerants. For example, the new HFC refrigerants, HFC-134a being the most widely used at this time, have zero ozone depletion potential and thus are not affected by the current regulatory phase out as a result of the Montreal Protocol.

However, further environmental regulations may ultimately cause global phase out of certain HFC refrigerants. Currently, the industry faces regulations relating to global warming potential (GWP) for refrigerants used in mobile air-conditioning. Should the regulations be more broadly applied in the future, for instance for stationary air conditioning and refrigeration systems, an even greater need will be felt for refrigerants that can be used in all areas of the refrigeration and air-conditioning industry. Uncertainty as to the ultimate regulatory requirements relative to GWP, have forced the industry to consider multiple candidate compounds and mixtures.

Currently proposed replacement refrigerants for HFC refrigerants and refrigerant blends include, for example, pure hydrocarbons such as butane or propane, or "natural" refrigerants such as $CO_2$. However, these suggested replacements have problems including toxicity, flammability, low energy efficiency, or require major equipment design modifications. Similarly, new replacements are being proposed also for R-22, R-134a, R-404A, and R-407C among others. Uncertainty as to what regulatory requirements relative to GWP will ultimately be adopted have forced the industry to consider multiple candidate compounds and mixtures that balance the need for low GWP, non-flammability or low flammability, and existing system performance parameters.

BRIEF SUMMARY

The present invention discloses low-GWP compositions as replacements for currently used refrigerants, including but not limited to existing refrigerants (see definition infra) such as R-407C (ASHRAE designation for a blend of 50 weight percent R125 and 50 weight percent R32), R-404A (ASHRAE designation for a blend of 44 weight percent R125, 52 weight percent R143a (1,1,1-trifluoroethane), and 4.0 weight percent R-134a), and R-22.

Often replacement refrigerants are most useful if capable of being used in the original refrigeration equipment designed for a different refrigerant. The compositions as disclosed herein may be useful as replacements for existing refrigerants (see definition infra) such as R-407C, R-404A, R-134a, and R-22 in equipment designed for existing refrigerants (see definition infra) such as R-407C, R-404A, R-134a, and R-22, respectively, with some system modifications. Further, the compositions as disclosed herein comprising HFO-1234yf or trans-HFO-1234ze or a mixture thereof; HFC-32; HFC-152a, HFO-1243zf or mixture thereof; and optionally R-134a may be useful as replacements for existing refrigerants (see definition infra) such as R-404A, R-407C, R-134a, and R-22 in equipment specifically modified for or produced entirely for these new compositions comprising HFO-1234yf or trans-HFO-1234ze or a mixture thereof; HFC-32; HFC-152a, HFO-1243zf or mixture thereof; and optionally R-134a.

In one embodiment, the present invention relates to a composition comprising HFO-1234yf or trans-HFO-1234ze or a mixture thereof; difluoromethane (HFC-32); and 1,1-difluoroethane (HFC-152a), 3,3,3-trifluoropropene (HFO-1243zf) or mixture thereof; wherein said composition is selected from the group consisting of:
(I) a first composition, wherein said HFO-1234yf or trans-HFO-1234ze or a mixture thereof is at least 56 weight percent of the total weight of said first composition;
(II) a second composition, wherein said HFC-32 is at most 29 weight percent of the total weight of said second composition;
(III) a third composition, wherein said HFC-152a, HFO-1243zf or mixture thereof is at least 56 weight percent of the total weight of said third composition;
(IV) a fourth composition, wherein said HFC-32 is at least 56 weight percent of the total weight of said fourth composition;
(V) a fifth composition comprising trans-HFO-1234ze; HFC-32; and HFC-152a, HFO-1243zf or mixture thereof; and
(VI) a sixth composition, wherein said HFO-1243zf or mixture thereof with HFC-152a is at most 20 weight percent of the total weight of said sixth composition.

This invention also relates to the above compositions wherein said compositions have a cooling capacity in the range of from about 75% to about 130% of at least one compound selected from the group of existing refrigerants (see definition infra) such as R-22, HFC-134a, R-404A, and R-407C.

This invention also relates to the above compositions consisting essentially of HFO-1234ze; HFC-32; and HFC-152a, HFO-1243zf or mixture thereof, wherein the HFC-152a, HFO-1243zf or mixture thereof is present at no more than about 15 weight percent of the total composition.

This invention also relates to a composition comprising HFO-1234yf or trans-HFO-1234ze or a mixture thereof; HFC-32; and HFC-152a, HFO-1243zf or mixture thereof; wherein the HFC-152a, HFO-1243zf or mixture thereof is in the range of from about 14 weight percent to about 16 weight percent, and wherein said composition has a cooling capacity in the range of from about 75% to about 130% of at least one compound selected from the group existing refrigerants (see definition infra) such as R-22, HFC-134a, R-404A, and R-407C.

In another embodiment, the compositions described supra further comprise at least one other saturated HFC, described infra, in the range of from about 0 weight percent (not included) to about 10 weight percent.

Another embodiment of the present invention relates to compositions recited above, wherein the GWP of said composition is less than the GWP of at least one compound selected from the group existing refrigerants (see definition infra) such as R-134a, R-22, R-407C, and R-404A.

The present invention also relates to a process to produce cooling comprising condensing the above-described compositions and thereafter evaporating said compositions in the vicinity of a body to be cooled. The present invention also relates to a process to produce heat comprising condensing compositions described above in the vicinity of a body to be heated and thereafter evaporating said compositions.

In yet another embodiment, this invention relates to a method for replacing existing refrigerants (see definition infra) such as R-22, R-404A, R-407C, or R-134a in a system designed to use R-22, R-404A, R-407C, or R-134a, respectively, wherein said method comprises providing compositions described above to said system.

This invention also relates to a refrigeration system, air-conditioning system, a stationary air conditioning apparatus, a stationary refrigeration system, an automotive air conditioner, or a heat pump containing compositions described above. The invention also relates to a process for using compositions described above as a power cycle working fluids.

This invention also relates to a composition comprising HFO-1234yf or trans-HFO-1234ze or a mixture thereof; HFC-32; and HFC-152a, HFO-1243zf or mixture thereof; wherein the HFC-152a, HFO-1243zf or mixture thereof is in the range of from about 14 weight percent to about 16 weight percent, and wherein said composition has a cooling capacity in the range of from about 75% to about 130% of at least one compound selected from the group of existing refrigerants (see definition infra) such as R-22, HFC-134a, R-404A, and R-407C.

Also disclosed herein are methods of producing cooling and heating, methods for replacing existing refrigerants such as R-134a, R410A and R-404A, and air conditioning and refrigeration apparatus containing compositions comprising HFO-1234yf or trans-HFO-1234ze or a mixture thereof; HFC-32; and HFC-152a, HFO-1243zf or mixture thereof.

BRIEF DESCRIPTION OF THE FIGURES

FIG. 1 describes Estimated Burning Velocity of HFO-1234yf/HFC-32/HFC-152a mixture as a function of the HFO-1234yf/HFC-152a ratio.

DETAILED DESCRIPTION

Before addressing details of embodiments described below, some terms are defined or clarified.

Definitions

As used herein, the term heat transfer composition means a composition used to carry heat from a heat source to a heat sink.

A heat source is defined as any space, location, object or body from which it is desirable to add, transfer, move or remove heat. Examples of heat sources are spaces (open or enclosed) requiring refrigeration or cooling, such as refrigerator or freezer cases in a supermarket, building spaces requiring air conditioning, industrial water chillers or the passenger compartment of an automobile requiring air conditioning. In some embodiments, the heat transfer composition may remain in a constant state throughout the transfer process (i.e., not evaporate or condense). In other embodiments, evaporative cooling processes may utilize heat transfer compositions as well.

A heat sink is defined as any space, location, object or body capable of absorbing heat. A vapor compression refrigeration system is one example of such a heat sink.

A heat transfer system is the system (or apparatus) used to produce a heating or cooling effect in a particular space. A heat transfer system may be a mobile system or a stationary system.

Examples of heat transfer systems include but are not limited to air conditioners, freezers, refrigerators, heat pumps, water chillers, flooded evaporator chillers, direct expansion chillers, walk-in coolers, mobile refrigerators, mobile air conditioning units, dehumidifiers, and combinations thereof.

As used herein, mobile heat transfer system refers to any refrigeration, air conditioner or heating apparatus incorporated into a transportation unit for the road, rail, sea or air. In addition, mobile refrigeration or air conditioner units, include those apparatus that are independent of any moving carrier and are known as "intermodal" systems. Such intermodal systems include "container' (combined sea/land transport) as well as "swap bodies" (combined road/rail transport).

As used herein, stationary heat transfer systems are systems that are fixed in place during operation. A stationary heat transfer system may be associated within or attached to buildings of any variety or may be stand-alone devices located out of doors, such as a soft drink vending machine. These stationary applications may be stationary air conditioning and heat pumps, including but not limited to chillers, high temperature heat pumps, residential, commercial or industrial air conditioning systems (including residential heat pumps), and including window, ductless, ducted, packaged terminal, and those exterior but connected to the building such as rooftop systems. In stationary refrigeration applications, the disclosed compositions may be useful in equipment including commercial, industrial or residential refrigerators and freezers, ice machines, self-contained coolers and freezers, flooded evaporator chillers, direct expansion chillers, walk-in and reach-in coolers and freezers, and combination systems. In some embodiments, the disclosed compositions may be used in supermarket refrigeration systems. Additionally, stationary applications may utilize a secondary loop system that uses a primary refrigerant to produce cooling in one location that is transferred to a remote location via a secondary heat transfer fluid.

Refrigeration capacity (also referred to as cooling capacity) is a term which defines the change in enthalpy of a refrigerant in an evaporator per pound of refrigerant circulated, or the heat removed by the refrigerant in the evaporator per unit volume of refrigerant vapor exiting the evaporator (volumetric capacity). The refrigeration capacity is a measure of the ability of a refrigerant or heat transfer composition to produce cooling. Therefore, the higher the capacity, the greater the cooling that is produced. Cooling rate refers to the heat removed by the refrigerant in the evaporator per unit time.

Coefficient of performance (COP) is the amount of heat removed divided by the required energy input to operate the cycle. The higher the COP, the higher is the energy efficiency. COP is directly related to the energy efficiency ratio (EER) that is the efficiency rating for refrigeration or air conditioning equipment at a specific set of internal and external temperatures.

The term "subcooling" refers to the reduction of the temperature of a liquid below that liquid's saturation point for a given pressure. The saturation point is the temperature at which the vapor is completely condensed to a liquid, but subcooling continues to cool the liquid to a lower temperature liquid at the given pressure. By cooling a liquid below the saturation temperature (or bubble point temperature), the net refrigeration capacity can be increased. Subcooling thereby improves refrigeration capacity and energy efficiency of a system. Subcool amount is the amount of cooling below the saturation temperature (in degrees).

Superheat is a term that defines how far above its saturation vapor temperature (the temperature at which, if the composition is cooled, the first drop of liquid is formed, also referred to as the "dew point") a vapor composition is heated.

Temperature glide (sometimes referred to simply as "glide") is the absolute value of the difference between the starting and ending temperatures of a phase-change process by a refrigerant within a component of a refrigerant system, exclusive of any subcooling or superheating. This term may be used to describe condensation or evaporation of a near azeotrope or non-azeotropic composition. When referring to the temperature glide of a refrigeration, air conditioning or heat pump system, it is common to provide the average temperature glide being the average of the temperature glide in the evaporator and the temperature glide in the condenser.

By azeotropic composition is meant a constant-boiling mixture of two or more substances that behave as a single substance. One way to characterize an azeotropic composition is that the vapor produced by partial evaporation or distillation of the liquid has the same composition as the liquid from which it is evaporated or distilled, i.e., the mixture distills/refluxes without compositional change. Constant-boiling compositions are characterized as azeotropic because they exhibit either a maximum or minimum boiling point, as compared with that of the non-azeotropic mixture of the same compounds. An azeotropic composition will not fractionate within a refrigeration or air conditioning system during operation. Additionally, an azeotropic composition will not fractionate upon leakage from a refrigeration or air conditioning system.

A near-azeotropic composition (also commonly referred to as an "azeotrope-like composition") is a substantially constant boiling liquid admixture of two or more substances that behaves essentially as a single substance. One way to characterize a near-azeotropic composition is that the vapor produced by partial evaporation or distillation of the liquid has substantially the same composition as the liquid from which it was evaporated or distilled, that is, the admixture distills/refluxes without substantial composition change. Another way to characterize a near-azeotropic composition is that the bubble point vapor pressure and the dew point vapor pressure of the composition at a particular temperature are substantially the same. Herein, a composition is near-azeotropic if, after 50 weight percent of the composition is removed, such as by evaporation or boiling off, the difference in vapor pressure between the original composition and the composition remaining after 50 weight percent of the original composition has been removed is less than about 10 percent.

A non-azeotropic composition is a mixture of two or more substances that behaves as a simple mixture rather than a single substance. One way to characterize a non-azeotropic composition is that the vapor produced by partial evaporation or distillation of the liquid has a substantially different composition as the liquid from which it was evaporated or distilled, that is, the admixture distills/refluxes with substantial composition change. Another way to characterize a non-azeotropic composition is that the bubble point vapor pressure and the dew point vapor pressure of the composition at a particular temperature are substantially different. Herein, a composition is non-azeotropic if, after 50 weight percent of the composition is removed, such as by evaporation or boiling off, the difference in vapor pressure between the original composition and the composition remaining after 50 weight percent of the original composition has been removed is greater than about 10 percent.

As used herein, the term "lubricant" means any material added to a composition or a compressor (and in contact with any heat transfer composition in use within any heat transfer system) that provides lubrication to the compressor to aid in preventing parts from seizing.

As used herein, compatibilizers are compounds which improve solubility of the hydrofluorocarbon of the disclosed compositions in heat transfer system lubricants. In some embodiments, the compatibilizers improve oil return to the compressor. In some embodiments, the composition is used with a system lubricant to reduce oil-rich phase viscosity.

As used herein, oil-return refers to the ability of a heat transfer composition to carry lubricant through a heat transfer system and return it to the compressor. That is, in use, it is not uncommon for some portion of the compressor lubricant to be carried away by the heat transfer composition from the compressor into the other portions of the system. In such systems, if the lubricant is not efficiently returned to the compressor, the compressor will eventually fail due to lack of lubrication.

As used herein, "ultra-violet" dye is defined as a UV fluorescent or phosphorescent composition that absorbs light in the ultra-violet or "near" ultra-violet region of the electromagnetic spectrum. The fluorescence produced by the UV fluorescent dye under illumination by a UV light that emits at least some radiation with a wavelength in the range of from 10 nanometers to about 775 nanometers may be detected.

Flammability is a term used to mean the ability of a composition to ignite and/or propagate a flame. For refrigerants and other heat transfer compositions, the lower flammability limit ("LFL") is the minimum concentration of the heat transfer composition in air that is capable of propagating a flame through a homogeneous mixture of the composition and air under test conditions specified in ASTM (American Society of Testing and Materials) E681. The upper flammability limit ("UFL") is the maximum concentration of the heat transfer composition in air that is capable of propagating a flame through a homogeneous mixture of the composition and air under the same test conditions. In order to be classified by ASHRAE (American Society of Heating, Refrigerating and Air-Conditioning Engineers) as non-flammable, a refrigerant must be non-flammable under the conditions of ASTM E681 as formulated in both the liquid and vapor phase as well as non-flammable in both the liquid and vapor phases that result during leakage scenarios.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced.

For mixtures, a weighted average can be calculated based on the individual GWPs for each component.

Ozone depletion potential (ODP) is a number that refers to the amount of ozone depletion caused by a substance. The ODP is the ratio of the impact on ozone of a chemical compared to the impact of a similar mass of CFC-11 (fluorotrichloromethane). Thus, the ODP of CFC-11 is defined to be 1.0. Other CFCs and HCFCs have ODPs that range from 0.01 to 1.0. HFCs have zero ODP because they do not contain chlorine.

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do materially affect the basic and novel characteristic(s) of the claimed invention. The term 'consisting essentially of' occupies a middle ground between "comprising" and 'consisting of'.

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the disclosed compositions, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

Compositions

In one embodiment, the present invention relates to compositions comprising three components, that is, 2,3,3,3-tetrafluoropropene (HFO-1234yf), difluoromethane (HFC-32), and 1,1-difluoroethane (HFC-152a), 3,3,3-trifluoropropene (HFO-1243zf) or mixture thereof. We note that in all exemplary embodiments disclosed herein, HFO-1234yf is used only as an example. In place of HFO-1234yf, trans-HFO-1234ze or its mixture with HFO-1234yf can also be used. Therefore, it is to be understood that in all examples infra and supra, HFO-1234yf also implies trans-HFO-1234ze and its mixture with HFO-1234yf are also implicated for the purposes of this invention, its disclosure, its patentability, and its claim scope, unless indicated otherwise. Thus, generally speaking, a reference to HFO-1234yf includes the trans-HFO-1234ze and its mixture with HFO-1234yf.

In another embodiment, the present invention relates to compositions comprising four components, that is, HFO-1234yf or trans-HFO-1234ze or a mixture thereof, HFC-32, HFC-152a, and at least one other hydrofluorocarbon comprising saturated compound comprising carbon, hydrogen, and fluorine.

A mixture of HFO-1234yf and trans-HFO-1234ze comprises from about 1 weight percent to about 99 weight percent of HFO-1234yf and from about 1 weight percent to about 99 weight percent of trans-HFO-1234ze. In other embodiments, the HFO-1234yf is selected from one of the following contents expressed in percentage of the total weight of the two components:

about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, and 99 weight percent.

In other embodiments, the trans-HFO-1234ze is selected from one of the following contents expressed in percentage of the total weight of the two components:

about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, and 99 weight percent.

2,3,3,3-tetrafluoropropene may also be referred to as HFO-1234yf, HFC-1234yf, or R1234yf. HFO-1234yf is available commercially or may be made by methods known in the art, such as by dehydrofluorination 1,1,1,2,3-pentafluoropropane (HFC-245eb) or 1,1,1,2,2-pentafluoropropane (HFC-245cb). HFO-1234yf and trans-HFO-1234ze are non-ozone depleting compounds with low global warming potential. HFO-1234yf flammability is classified as 2L or low flammability according to ASHRAE Standard 34-2010.

Trans-1,3,3,3-tetrafluoropropene may also be referred to as trans-HFO-1234ze or trans-HFC-1234ze. Trans-HFO-1234ze may be made by methods known in the art such as by dehydrofluorination of 1,1,1,2,3-pentafluoropropane (HFC-245eb) or 1,1,1,3,3-pentafluoropropane (HFC-245fa).

Difluoromethane (HFC-32 or R32) is commercially available or may be made by methods known in the art, such as by dechlorofluorination of methylene chloride. HFC-32 is a non-ozone depleting compound with low global warming potential. HFC-32 flammability is classified as 2L or low flammability according to ASHRAE Standard 34-2010.

1,1-Difluoroethane may also be referred to as HFC-152a or R152a. HFC-152a is commercially available or may be made by methods known in the art such by reaction of vinyl chloride with hydrogen fluoride in the presence of a catalyst. HFC-152a is non-ozone depleting compound with low global warming potential. HFC-152a flammability is classified as 2 or moderate flammability according to ASHRAE Standard 34-2010.

3,3,3-Trifluoropropene may also be referred to as HFO-1243zf, HFC-1243zf, or TFP. HFO-1243zf is available commercially or may be made by methods known in the art such as by hydrogenation of 1,3,3,3-tetrafluoropropene to give 1,1,1,3-tetrafluoropropane and then dehydrofluorination of 1,1,1,3-tetrafluoropropane as described in U.S. Pat. No. 5,986,151. It has been found that the compositions of the present invention are useful in processes for producing cooling or heat, as heat transfer fluids, foam blowing agents, and aerosol propellants. But that at the same time, these compositions will help reduce refrigerant costs while maintaining cooling capacity and energy efficiency with no substantial flammability increases. Generally, the flammability of the preferred embodiments of the present invention is at the 2L level and certainly no greater than 2.

Both HFO-1234yf or trans-HFO-1234ze or a mixture thereof, and HFC-32 are being considered as low GWP replacements for certain refrigerants and refrigerant mixtures that have relatively high GWP. In particular, R-404A has a GWP of 3922 and will be in need of replacement. Further, R507 (ASHRAE designation for a mixture containing 50 wt % HFC-125 and 50 wt % HFC-143a), which has virtually identical properties to R-404A and can therefore be used in many R-404A systems, has a GWP equal to 3985, and therefore will be in need of replacement as well. Similarly, R-22 and R-407C have a GWP of 1810 and 1774 respectively. Also HFC-134a (tetrafluoroethane, in particular 1,1,1,2-tetrafluoroethane) is currently used as a refrigerant in many applications, has a GWP of 1430 and is in need of replacement.

This invention generally relates to compositions comprising HFC-152a in addition to the HFO-1234yf or trans-HFO-1234ze or a mixture thereof, and HFC-32 components. It has been found that in one embodiment of the invention, a three-component system as described herein can reduce the overall GWP to below 300, while maintaining at least about 75% of the cooling capacity relative to existing refrigerants (see definition infra) such as R-134a, R-22, R-407C, and R-404A.

In some embodiments of the present invention, the compositions may include at least one other hydrofluorocarbon comprising a saturated compound comprising carbon, hydrogen, and fluorine (hereinafter "saturated HFC") include hydrofluorocarbons having 1-7 carbon atoms and having a normal boiling point of from about −90® C. to about 80® C. Such saturated HFCs are commercial products available from a number of sources such as E. I. du Pont de Nemours & Co., Fluoroproducts, Wilmington, Del., 19898, USA, or may be prepared by methods known in the art. Representative saturated HFC compounds include but are not limited to fluoromethane ($CH_3F$, HFC-41), trifluoromethane ($CHF_3$, HFC-23), pentafluoroethane ($CF_3CHF_2$, HFC-125), 1,1,2,2-tetrafluoroethane ($CHF_2CHF_2$, HFC-134), 1,1,1,2-tetrafluoroethane ($CF_3CH_2F$, HFC-134a), 1,1,1-trifluoroethane ($CF_3CH_3$, HFC-143a), fluoroethane (HFC-161, $CH_3CH_2F$), 1,1,1,2,2,3,3-heptafluoropropane ($CF_3CF_2CHF_2$, HFC-227ca), 1,1,1,2,3,3,3-heptafluoropropane ($CF_3CHFCF_3$, HFC-227ea), 1,1,2,2,3,3-hexafluoropropane ($CHF_2CF_2CHF_2$, HFC-236ca), 1,1,1,2,2,3-hexafluoropropane ($CF_3CF_2CH_2F$, HFC-236cb), 1,1,1,2,3,3-hexafluoropropane ($CF_3CHFCHF_2$, HFC-236ea), 1,1,1,3,3,3-hexafluoropropane ($CF_3CH_2CF_3$, HFC-236fa), 1,1,2,2,3-pentafluoropropane ($CHF_2CF_2CH_2F$, HFC-245ca), 1,1,1,2,2-pentafluoropropane ($CF_3CF_2CH_3$, HFC-245cb), 1,1,2,3,3-pentafluoropropane ($CHF_2CHFCHF_2$, HFC-245ea), 1,1,1,2,3-pentafluoropropane ($CF_3CHFCH_2F$, HFC-245eb), 1,1,1,3,3-pentafluoropropane ($CF_3CH_2CHF_2$, HFC-245fa), 1,2,2,3-tetrafluoropropane ($CH_2FCF_2CH_2F$, HFC-254ca), 1,1,2,2-tetrafluoropropane ($CHF_2CF_2CH_3$, HFC-254cb), 1,1,2,3-tetrafluoropropane ($CHF_2CHFCH_2F$, HFC-254ea), 1,1,1,2-tetrafluoropropane ($CF_3CHFCH_3$, HFC-254eb), 1,1,3,3-tetrafluoropropane ($CHF_2CH_2CHF_2$, HFC-254fa), 1,1,1,3-tetrafluoropropane ($CF_3CH_2CH_2F$, HFC-254fb), 1,1,1-trifluoropropane ($CF_3CH_2CH_3$, HFC-263fb), 2,2-difluoropropane ($CH_3CF_2CH_3$, HFC-272ca), 1,2-difluoropropane ($CH_2FCHFCH_3$, HFC-272ea), 1,3-difluoropropane ($CH_2FCH_2CH_2F$, HFC-272fa), 1,1-difluoropropane ($CHF_2CH_2CH_3$, HFC-272fb), 2-fluoropropane ($CH_3CHFCH_3$, HFC-281ea), 1-fluoropropane ($CH_2FCH_2CH_3$, HFC-281fa), 1,1,2,2,3,3,4,4-octafluorobutane ($CHF_2CF_2CF_2CHF_2$, HFC-338pcc), 1,1,1,2,2,4,4,4-octafluorobutane ($CF_3CH_2CF_2CF_3$, HFC-338mf), 1,1,1,3,3-pentafluorobutane ($CF_3CH_2CHF_2$, HFC-365mfc), 1,1,1,2,3,4,4,5,5,5-decafluoropentane ($CF_3CHFCHFCF_2CF_3$, HFC-43-10mee), and 1,1,1,2,2,3,4,5,5,6,6,7,7,7-tetradecafluoroheptane ($CF_3CF_2CHFCHFCF_2CF_2CF_3$, HFC-63-14mee).

Of particular utility as the other saturated HFC compounds would be those non-flammable fluorocarbon refrigerants including HFC-134, HFC-134a, HFC-125 (pentafluoroethane), HFC-23 (trifluoromethane), HFC-236fa (1,1,1,3,3,3-hexafluoropropane), HFC-227ea (1,1,1,2,3,3,3-heptafluoropropane), and $CF_3I$. All of these could be added to improve flammability characteristics due to their non-flammable nature.

Exemplary Embodiment 1

In a first exemplary embodiment of the present invention, the composition comprises three components: (A) HFO-1234yf or trans-HFO-1234ze or a mixture thereof; (B) HFC-32; and (C) HFC-152a, HFO-1243zf or a mixture thereof; wherein said HFO-1234yf or trans-HFO-1234ze or a mixture thereof is greater than about 56 weight percent.

For the composition of this embodiment, it is to be understood that the HFO-1234yf or trans-HFO-1234ze or a mixture thereof content is greater than about 56 weight percent by weight of the total composition, but at the same time, some amount of HFC-32 and some amount of HFC-152a are always present in the compositions of this embodiment.

For the compositions of this embodiment:
(A1) HFO-1234yf or trans-HFO-1234ze or a mixture thereof content can be about 56%, 57%, 58%, 59%, 60%, 81%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or about 99% by weight of the composition;
(B1) HFC-32 can be about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, or about 43% by weight of the composition; and (C1) HFC-152a or HFO-1243zf or a mixture thereof content can be about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, or about 43% by weight of the composition.

Also, for the compositions of this embodiment:

(A1') HFO-1234yf or trans-HFO-1234ze or a mixture thereof content can also be a weight percent number that is in between the specific weight percent numbers cited supra. For example, HFO-1234yf or trans-HFO-1234ze or a mixture thereof can be about 56.5%, 57.5%, 58.5%, 59.5%, 60.5%, 61.5%, 62.5%, 63.5%, 64.5%, 65.5%, 66.5%, 67.5%, 68.5%, 69.5%, 70.5%, 71.5%, 72.5%, 73.5%, 74.5%, 75.5%, 76.5%, 77.5%, 78.5%, 79.5%, 80.5%, 81.5%, 82.5%, 83.5%, 84.5%, 85.5%, 86.5%, 87.5%, 88.5%, 89.5%, 90.5%, 91.5%, 92.5%, 93.5%, 94.5%, 95.5%, 96.5%, 97.5%, 98.5% by weight of the composition;

(B1') HFC-32 content can also be a weight percent number that is in between the specific weight percent numbers cited supra. For example, HFC-32 can be about 0.5%, 1.5%, 2.5%, 3.5%, 4.5%, 5.5%, 6.5%, 7.5%, 8.5%, 9.5%, 10.5%, 11.5%, 12.5%, 13.5%, 14.5%, 15.5%, 16.5, 17.5%, 18.5%, 19.5%, 20.5%, 21.5%, 22.5%, 23.5%, 24.5%, 25.5%, 26.5%, 27.5%, 28.5%, 29.5%, 30.5%, 31.5%, 32.5%, 33.5%, 34.5%, 35.5%, 36.5%, 37.5%, 38%, 39.5%, 40.5%, 41.5%, 42.5%, or about 43.5% by weight of the composition; and (C1') HFC-152a or HFO-1243zf or a mixture thereof content can also be a weight percent number that is in between the specific weight percent numbers cited supra. For example, HFC-152a can be about 0.5%, 1.5%, 2.5%, 3.5%, 4.5%, 5.5%, 6.5%, 7.5%, 8.5%, 9.5%, 10.5%, 11.5%, 12.5%, 13.5%, 14.5%, 15.5%, 16.5%, 17.5%, 18.5%, 19.5%, 20.5%, 21.5%, 22.5%, 23.5%, 24.5%, 25.5%, 26.5%, 27.5%, 28.5%, 29.5%, 30.5%, 31.5%, 32.5%, 33.5%, 34.5%, 35.5%, 36.5%, 37.5%, 38%, 39.5%, 40.5%, 41.5%, 42.5%, or about 43.5% by weight of the composition.

(D1) In an alternative embodiment, at least one saturated HFC, as described supra, may also be included in the compositions described above. The weight percent of said at least one saturated HFC to the total weight of the composition can be in the range of from about 0 weight percent to about 10 weight percent. The weight percent of said at least one saturated HFC in the composition can be about 0.5%, 1%, 1.5%, 2%, 2.5%, 3%, 3.5%, 4%, 45%, 5%, 5.5%, 6%, 6.5%, 7%, 7.5%, 8%, 8.5%, 9%, 9.5%, and 10%.

Similarly, other numbers in between the integer numbers supra, for example, 56.1, 56.2, 56.3 and the like can also be included for the content of the four components described above.

It should also be understood that HFO-1234yf or trans-HFO-1234ze or a mixture thereof can be within a weight percent composition range formed by any two numbers in paragraphs (A1) and (A1') supra. Similarly, HFC-32 can be within a weight percent composition range formed by any two numbers in paragraphs (B1) and (B1') supra; HFC-152a can be within a weight percent composition range formed by any two numbers in paragraphs (C1) and (C1') supra, and said at least one saturated HFC can be within a weight percent composition range formed by any two numbers in paragraph D1.

Compositions of note include:

compositions comprising from about 56 to about 98 weight percent HFO-1234yf or trans-HFO-1234ze or a mixture thereof; from about 1 to about 29 weight percent HFC-32; and from about 1 to about 18 weight percent HFC-152a, HFO-1243zf, or mixtures thereof;

compositions comprising from about 60 to about 90 weight percent HFO-1234yf or trans-HFO-1234ze or a mixture thereof; from about 5 to about 25 weight percent HFC-32; and from about 5 to about 15 weight percent HFC-152a, HFO-1243zf, or mixtures thereof;

compositions comprising from about 75 to about 85 weight percent HFO-1234yf or trans-HFO-1234ze or a mixture thereof; about 10 weight percent HFC-32; and from about 5 to about 15 weight percent HFC-152a, HFO-1243zf, or mixtures thereof; and compositions comprising from about 58 to about 73.5 weight percent HFO-1234yf or trans-HFO-1234ze or a mixture thereof, about 21.5 weight percent HFC-32, and from about 5 to about 20 weight percent HFC-152a, HFO-1243zf, or mixtures thereof.

Of significant utility, for this embodiment, are compositions comprising from about 56 to about 98 weight percent HFO-1234yf or HFO-1234ze or a mixture thereof; from about 1 to about 43 weight percent HFC-32; and from about 1 to about 18 weight percent HFC-152a, HFO-1243zf, or mixtures thereof. Of note are compositions comprising about 75-85 weight percent HFO-1234yf, about 10 weight percent HFC-32, and about 5-15 weight percent HFC-152a, HFO-1243zf, or mixtures thereof. These compositions provide low GWP replacements for R-134a.

Also of significant utility, for this embodiment, are compositions comprising from about 56 to about 98 weight percent HFO-1234yf or HFO-1234ze or a mixture thereof; from about 1 to about 43 weight percent HFC-32; and from about 1 to about 15 weight percent HFC-152a, HFO-1243zf, or mixtures thereof.

Also of utility are compositions comprising from about 58 to about 74 weight percent HFO-1234yf, about 21.5 weight percent HFC-32, and from about 5 to about 20 weight percent HFC-152a, which provide low GWP replacements for R-22. Also, compositions comprising from about 58 to about 74 weight percent HFO-1234yf, about 21.5 weight percent HFC-32, and from about 5 to about 20 weight percent HFC-152a, HFO-1243zf, or mixtures thereof, which provide low GWP replacements for R-407C.

Also of utility are compositions comprising from about 56 weight percent to about 72 weight percent HFO-1234yf; from about 8 weight percent to about 39 weight percent HFC-32; and from about 5 weight percent to about 20 weight percent HFC-152a, that provide low GWP replacements for R-22. Also compositions comprising from about 56 weight percent to about 72 weight percent HFO-1234yf; from about 8 weight percent to about 39 weight percent HFC-32; and from about 5 weight percent to about 20 weight percent HFC-152a, that provide low GWP replacements for R-407C.

Also of particular utility are compositions comprising from about 56 weight percent to about 62 weight percent HFO-1234yf; from about 8 weight percent to about 29 weight percent HFC-32; from about 5 weight percent to about 20 weight percent HFC-152a; and about 10 weight percent HFC-134a, that provide low GWP replacements for R-22. Also compositions comprising from about 56 weight percent to about 62 weight percent HFO-1234yf; from about 8 weight percent to about 29 weight percent HFC-32; from about 5 weight percent to about 20 weight percent HFC- 152a; and about 10 weight percent HFC-134a, that provide low GWP replacements for R-407C.

Of particular utility, for this embodiment, are compositions comprising from about 56 to about 98 weight percent trans-HFO-1234ze; from about 1 to about 43 weight percent HFC-32; and from about 1 to about 20 weight percent HFC-152a, HFO-1243zf, or mixtures thereof.

Also of note are compositions comprising from about 75 to about 85 weight percent trans-HFO-1234ze, about 10 weight percent HFC-32, and from about 5 to about 15 weight percent HFC-152a, HFO-1243zf, or mixtures thereof, which provide low GWP replacements for R-134a with improved cooling performance.

In another embodiment, compositions comprising from about 37 to about 53 weight percent trans-HFO-1234ze, about 42.5 weight percent HFC-32, and from about 5 to about 20 weight percent HFC-152a, HFO-1243zf, or mixtures thereof, provide low GWP replacements for R-404A.

Exemplary Embodiment 2

In a second exemplary embodiment of the present invention, the composition comprises three components: (A) HFO-1234yf or trans-HFO-1234ze or a mixture thereof; (B) HFC-32; and (C) HFC-152a; wherein said HFC-32 component is less than about 29 weight percent by weight of the total composition. But at the same time, some amount of HFO-1234yf or trans-HFO-1234ze or a mixture thereof and some amount of HFC-152a, HFO-1243zf, or mixture thereof are always present in the compositions of the present invention.

For the compositions of this embodiment:
(A2) HFO-1234yf or trans-HFO-1234ze or a mixture thereof content can be about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29% 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or about 99% by weight of the composition;
(B2) HFC-32 can be any number within the range of from about 1% to about 29%, for example, HFC-32 can be about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, or about 29%, by weight of the composition; and
(C2) HFC-152a content can be about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29% 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or about 99% by weight of the composition.

For the compositions of this embodiment:
(A2') HFO-1234yf or trans-HFO-1234ze or a mixture thereof content can also be a weight percent number that is in between the specific weight percent numbers cited supra. For example, HFO-1234yf or trans-HFO-1234ze or a mixture thereof can be about 0.5%, 1.5%, 2.5%, 3.5%, 4.5%, 5.5%, 6.5%, 7.5%, 8.5%, 9.5%, 10.5%, 11.5%, 12.5%, 13.5%, 14.5%, 15.5%, 16.5, 17.5, 18.5, 19.5%, 20.5%, 21.5%, 22.5%, 23.5%, 24.5%, 25.5%, 26.5%, 27.5%, 28.5%, 29.5%, 30.5%, 31.5%, 32.5%, 33.5%, 34.5%, 35.5%, 36.5%, 37.5%, 38%, 39.5%, 40.5%, 41.5%, 42.5%, 43.5%, 44.5%, 45.5%, 46.5%, 47.5%, 48.5%, 49.5%, 50.5%, 51.5%, 52.5%, 53.5%, 54.5%, 55.5%, 56.5%, 57.5%, 58.5%, 59.5%, 60.5%, 61.5%, 62.5%, 63.5%, 64.5%, 65.5%, 66.5%, 67.5%, 68.5%, 69.5%, 70.5%, 71.5%, 72.5%, 73.5%, 74.5%, 75.5%, 76.5%, 77.5%, 78.5%, 79.5%, 80.5%, 81.5%, 82.5%, 83.5%, 84.5%, 85.5.%, 86.5%, 87.5% 88.5%, 89.5%, 90.5%, 91.5%, 92.5%, 93.5%, 94.5%, 95.5.%, 96.5%, 97.5%, or about 98.5%, by weight of the composition;
(B2') HFC-32 content can also be a weight percent number that is in between the specific weight percent numbers cited supra. For example, HFC-32 can be about 0.5%, 1.5%, 2.5%, 3.5%, 4.5%, 5.5%, 6.5%, 7.5%, 8.5%, 9.5%, 10.5%, 11.5%, 12.5%, 13.5%, 14.5%, 15.5%, 16.5, 17.5, 18.5, 19.5%, 20.5%, 21.5%, 22.5%, 23.5%, 24.5%, 25.5%, 26.5%, 27.5%, or about 28.5% by weight of the composition;
(C2') HFC-152a content can also be a weight percent number that is in between the specific weight percent numbers cited supra. For example, HFC-152a can be about 1.5%, 2.5%, 3.5%, 4.5%, 5.5%, 6.5%, 7.5%, 8.5%, 9.5%, 10.5%, 11.5%, 12.5%, 13.5%, 14.5%, 15.5%, 16.5, 17.5, 18.5, 19.5%, 20.5%, 21.5%, 22.5%, 23.5%, 24.5%, 25.5%, 26.5%, 27.5%, 28.5%, 29.5%, 30.5%, 31.5%, 32.5%, 33.5%, 34.5%, 35.5%, 36.5%, 37.5%, 38%, 39.5%, 40.5%, 41.5%, 42.5%, 43.5%, 44.5%, 45.5%, 46.5%, 47.5%, 48.5%, 49.5%, 50.5%, 51.5%, 52.5%, 53.5%, 54.5%, 55.5%, 56.5%, 57.5%, 58.5%, 59.5%, 60.5%, 61.5%, 62.5%, 63.5%, 64.5%, 65.5%, 66.5%, 67.5%, 68.5%, 69.5%, 70.5%, 71.5%, 72.5%, 73.5%, 74.5%, 75.5%, 76.5%, 77.5%, 78.5%, 79.5%, 80.5%, 81.5%, 82.5%, 83.5%, 84.5%, 85.5.%, 86.5%, 87.5% 88.5%, 89.5%, 90.5%, 91.5%, 92.5%, 93.5%, 94.5%, 95.5.%, 96.5%, 97.5%, or about 98.5%, by weight of the composition.
(D2) In an alternative embodiment, at least one saturated HFCs may also be included in the compositions described above. The weight percent of said at least one saturated HFC to the total weight of the composition can be in the range of from about 0% to about 10%. The weight percent of said at least one saturated HFC in the composition can be about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, and 10%.

Similarly, other numbers in between the integer numbers supra, for example, 56.1, 56.2, 56.3 and the like can also be included for the content of the four components described above.

It should also be understood that HFO-1234yf or trans-HFO-1234ze or a mixture thereof can be within a weight percent composition range formed by any two numbers in paragraphs (A2) and (A2') supra. Similarly, HFC-32 can be within a weight percent composition range formed by any two numbers in paragraphs (B2) and (B2') supra; HFC-152a can be within a weight percent composition range formed by any two numbers in paragraphs (C2) and (C2') supra, and said at least one saturated HFC can be within a weight percent composition range formed by any two numbers in paragraph D2.

Of particular utility, for this embodiment, are compositions comprising from about 56 to about 98 weight percent HFO-1234yf or HFO-1234ze or a mixture thereof; from about 1 to about 29 weight percent HFC-32; and from about 1 to about 15 weight percent HFC-152a.

Also of particular utility are compositions comprising from about 75 to about 85 weight percent HFO-1234yf or trans-HFO-1234ze or a mixture thereof; about 10 weight percent HFC-32; and from about 5 to about 15 weight percent HFC-152a, HFO-1243zf, or mixtures thereof.

Also of particular utility are compositions comprising from about 58 to about 73.5 weight percent HFO-1234yf or trans-HFO-1234ze or a mixture thereof, about 21.5 weight percent HFC-32, and from about 5 to about 20 weight percent HFC-152a, HFO-1243zf, or mixtures thereof.

Of note are compositions comprising from about 75 to about 85 weight percent HFO-1234yf, about 10 weight percent HFC-32, and from about 5 to about 15 weight percent HFC-152a, HFO-1243zf, or mixtures thereof. These compositions provide low GWP replacements for R-134a.

Exemplary Embodiment 3

In a third exemplary embodiment of the present invention, the composition comprises three components: (A) HFO-1234yf or trans-HFO-1234ze or a mixture thereof; (B) HFC-32; and (C) HFC-152a; wherein said HFC-152a is greater than about 56 weight percent. But at the same time, some amount of HFO-1234yf or trans-HFO-1234ze or a mixture thereof and some amount of HFC-32 are always present in the compositions of the present invention.

For the compositions of this embodiment:
(A3) HFO-1234yf or trans-HFO-1234ze or a mixture thereof content can be any number within the range of from about 1% to about 43%, for example, HFO-1234yf or trans-HFO-1234ze or a mixture thereof can be about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, or about 43% by weight of the composition;
(B3) HFC-32 can be any number within the range of from about 1% to about 43%, for example, HFC-32 can be about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, or about 43% by weight of the composition; and
(C3) HFC-152a content can be about 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, or about 98% by weight of the composition.

For the compositions of this embodiment:
(A3') HFO-1234yf or trans-HFO-1234ze or a mixture thereof content can also be a weight percent number that is in between the specific weight percent numbers cited supra. For example, HFO-1234yf or trans-HFO-1234ze or a mixture thereof can be about 0.5%, 1.5%, 2.5%, 3.5%, 4.5%, 5.5%, 6.5%, 7.5%, 8.5%, 9.5%, 10.5%, 11.5%, 12.5%, 13.5%, 14.5%, 15.5%, 16.5, 17.5, 18.5, 19.5%, 20.5%, 21.5%, 22.5%, 23.5%, 24.5%, 25.5%, 26.5%, 27.5%, 28.5%, 29.5%, 30.5%, 31.5%, 32.5%, 33.5%, 34.5%, 35.5%, 36.5%, 37.5%, 38%, 39.5%, 40.5%, 41.5%, 42.5%, or about 43.5% by weight of the composition;
(B3') HFC-32 content can also be a weight percent number that is in between the specific weight percent numbers cited supra. For example, HFC-32 can be about 0.5%, 1.5%, 2.5%, 3.5%, 4.5%, 5.5%, 6.5%, 7.5%, 8.5%, 9.5%, 10.5%, 11.5%, 12.5%, 13.5%, 14.5%, 15.5%, 16.5, 17.5, 18.5, 19.5%, 20.5%, 21.5%, 22.5%, 23.5%, 24.5%, 25.5%, 26.5%, 27.5%, 28.5%, 29.5%, 30.5%, 31.5%, 32.5%, 33.5%, 34.5%, 35.5%, 36.5%, 37.5%, 38%, 39.5%, 40.5%, 41.5%, 42.5%, or about 43.5% by weight of the composition; and
(C3') HFC-152a content can also be a weight percent number that is in between the specific weight percent numbers cited supra. For example, HFC-152a can be about 56.5%, 57.5%, 58.5%, 59.5%, 60.5%, 61.5%, 62.5%, 63.5%, 64.5%, 65.5%, 66.5%, 67.5%, 68.5%, 69.5%, 70.5%, 71.5%, 72.5%, 73.5%, 74.5%, 75.5%, 76.5%, 77.5%, 78.5%, 79.5%, 80.5%, 81.5%, 82.5%, 83.5%, 84.5%, 85.5%, 86.5%, 87.5%, 88.5%, 89.5%, 90.5%, 91.5%, 92.5%, 93.5%, 94.5%, 95.5%, 96.5%, 97.5%, or about 98.5% by weight of the composition.

(D3) In an alternative embodiment, at least one saturated HFC may also be included in the compositions described above. The weight percent of said at least one saturated HFC to the total weight of the composition can be in the range of from about 0% to about 10%. The weight percent of said at least one saturated HFC in the composition can be about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, and 10%.

Similarly, other numbers in between the integer numbers supra, for example, 56.1, 56.2, 56.3 and the like can also be included for the content of the four components described above.

It should also be understood that HFO-1234yf or trans-HFO-1234ze or a mixture thereof can be within a weight percent composition range formed by any two numbers in paragraphs (A3) and (A3') supra. Similarly, HFC-32 can be within a weight percent composition range formed by any two numbers in paragraphs (B3) and (B3') supra; HFC-152a can be within a weight percent composition range formed by any two numbers in paragraphs (C3) and (C3') supra, and said at least one saturated HFC can be within a weight percent composition range formed by any two numbers in paragraph D3.

Of particular utility are compositions comprising from about 1 weight percent to about 43 weight percent HFO-1234yf or trans-HFO-1234ze or a mixture thereof; from about 1 weight percent to about 43 weight percent HFC-32; and from about 56 weight percent to about 98 weight percent 152a.

Also of particular utility are compositions comprising from about 20 weight percent to about 30 weight percent HFO-1234yf or trans-HFO-1234ze or a mixture thereof; about 10 weight percent HFC-32; and from about 60 weight percent to about 70 weight percent HFC-152a, which provide low GWP replacements for R-134a.

Exemplary Embodiment 4

In a fourth exemplary embodiment of the present invention, the composition of the present invention comprises three components: (A) HFO-1234yf or trans-HFO-1234ze or a mixture thereof; (B) HFC-32; and (C) HFC-152a, HFO-1243zf, or mixture thereof; wherein said HFC-152a, HFO-1243zf or mixture thereof is in the range of from about 14 weight percent to about 16 weight percent.

For the compositions of this embodiment:
(A4) HFO-1234yf or trans-HFO-1234ze or a mixture thereof content can be any number within the range of from about 0.5% to about 85.5% including every number within the range that is 0.1% increment over the previous number, by weight of the composition;

(B4) HFC-32 can be any number within the range of from about 0.5% to about 85.5% including every number within the range that is 0.1% increment over the previous number, by weight of the composition; and (C4) HFC-152a, HFO-1243zf or mixture thereof content can be about 14%, 14.5%, 15%, 15.5%, or about 16% by weight of the composition.

(D4) In an alternative embodiment, at least one saturated HFC may also be included in the compositions described above. The weight percent of HFC-134a to the total weight of the composition can be in the range of from about 0% to about 10%. The weight percent of HFC-134a in the composition can be about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, and 10%.

Similarly, other numbers in between the integer numbers supra, for example, 56.1, 56.2, 56.3 and the like can also be included for the content of the four components described above.

It should also be understood that HFO-1234yf or trans-HFO-1234ze or a mixture thereof can be within a weight percent composition range formed by any two numbers in paragraphs (A4) supra. Similarly, HFC-32 can be within a weight percent composition range formed by any two numbers in paragraphs (B4) supra; HFC-152a can be within a weight percent composition range formed by any two numbers in paragraphs (C4) supra, and said at least one saturated HFC can be within a weight percent composition range formed by any two numbers in paragraph D4.

Exemplary Embodiment 5

In a fifth exemplary embodiment of the present invention, the composition comprises three components: (A) HFO-1234yf or trans-HFO-1234ze or a mixture thereof; (B) HFC-32; and (C) HFC-152a, HFO-1243zf, or mixture thereof; wherein said HFC-32 component is greater than about 56% by weight of the total composition. But at the same time, some amount of HFO-1234yf or trans-HFO-1234ze or a mixture thereof and some amount of HFC-152a, HFO-1243zf or mixture thereof are always present in the compositions of the present invention.

For the compositions of this embodiment:

(A5) HFO-1234yf or trans-HFO-1234ze or a mixture thereof content can be about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29% 30%, 31%, 32%, 33%, 34%, 35%, 36%, 37%, 38%, 39%, 40%, 41%, 42%, or about 43% by weight of the composition;

(B5) HFC-32 can be any number within the range of from about 1% to about 29%, for example, HFC-32 can be about 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or about 99% by weight of the composition; and (C5) HFC-152a content can be about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29% 30%, 31%, 32%, 33%, 34%, 35%, 36%, 37%, 38%, 39%, 40%, 41%, 42%, or about 43% by weight of the composition.

For the compositions of this embodiment:

(A5') HFO-1234yf or trans-HFO-1234ze or a mixture thereof content can also be a weight percent number that is in between the specific weight percent numbers cited supra. For example, HFO-1234yf or trans-HFO-1234ze or a mixture thereof can be about 0.5%, 1.5%, 2.5%, 3.5%, 4.5%, 5.5%, 6.5%, 7.5%, 8.5%, 9.5%, 10.5%, 11.5%, 12.5%, 13.5%, 14.5%, 15.5%, 16.5, 17.5, 18.5, 19.5%, 20.5%, 21.5%, 22.5%, 23.5%, 24.5%, 25.5%, 26.5%, 27.5%, 28.5%, 29.5%, 30.5%, 31.5%, 32.5%, 33.5%, 34.5%, 35.5%, 36.5%, 37.5%, 38%, 39.5%, 40.5%, 41.5%, 42.5%, or about 43.5% by weight of the composition;

(B5') HFC-32 content can also be a weight percent number that is in between the specific weight percent numbers cited supra. For example, HFC-32 can be about 56.5%, 57.5%, 58.5%, 59.5%, 60.5%, 61.5%, 62.5%, 63.5%, 64.5%, 65.5%, 66.5%, 67.5%, 68.5%, 69.5%, 70.5%, 71.5%, 72.5%, 73.5%, 74.5%, 75.5%, 76.5%, 77.5%, 78.5%, 79.5%, 80.5%, 81.5%, 82.5%, 83.5%, 84.5%, 85.5.%, 86.5%, 87.5% 88.5%, 89.5%, 90.5%, 91.5%, 92.5%, 93.5%, 94.5%, 95.5.%, 96.5%, 97.5%, or about 98.5%, by weight of the composition;

(C5') HFC-152a content can also be a weight percent number that is in between the specific weight percent numbers cited supra. For example, HFC-152a can be about 0.5%, 1.5%, 2.5%, 3.5%, 4.5%, 5.5%, 6.5%, 7.5%, 8.5%, 9.5%, 10.5%, 11.5%, 12.5%, 13.5%, 14.5%, 15.5%, 16.5, 17.5, 18.5, 19.5%, 20.5%, 21.5%, 22.5%, 23.5%, 24.5%, 25.5%, 26.5%, 27.5%, 28.5%, 29.5%, 30.5%, 31.5%, 32.5%, 33.5%, 34.5%, 35.5%, 36.5%, 37.5%, 38%, 39.5%, 40.5%, 41.5%, 42.5%, 43.5%, 44.5%, 45.5%, 46.5%, 47.5%, 48.5%, 49.5%, 50.5%, 51.5%, 52.5%, 53.5%, 54.5%, 55.5%, 56.5%, 57.5%, 58.5%, 59.5%, 60.5%, 61.5%, 62.5%, 63.5%, 64.5%, 65.5%, 66.5%, 67.5%, 68.5%, 69.5%, 70.5%, 71.5%, 72.5%, 73.5%, 74.5%, 75.5%, 76.5%, 77.5%, 78.5%, 79.5%, 80.5%, 81.5%, 82.5%, 83.5%, 84.5%, 85.5.%, 86.5%, 87.5% 88.5%, 89.5%, 90.5%, 91.5%, 92.5%, 93.5%, 94.5%, 95.5.%, 96.5%, 97.5%, or about 98.5%, by weight of the composition.

(D5) In an alternative embodiment, at least one saturated HFC may also be included in the compositions described above. The weight percent of said at least one saturated HFC to the total weight of the composition can be in the range of from about 0% to about 10%. The weight percent of at least one saturated HFC in the composition can be about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, and 10%.

Similarly, other numbers in between the integer numbers supra, for example, 56.1, 56.2, 56.3 and the like can also be included for the content of the four components described above.

It should also be understood that HFO-1234yf or trans-HFO-1234ze or a mixture thereof can be within a weight percent composition range formed by any two numbers in paragraphs (A5) and (A5') supra. Similarly, HFC-32 can be within a weight percent composition range formed by any two numbers in paragraphs (B5) and (B5') supra; HFC-152a can be within a weight percent composition range formed by any two numbers in paragraphs (C5) and (C5') supra, and at least one saturated HFC can be within a weight percent composition range formed by any two numbers in paragraph D5.

In another embodiment, of particular utility are compositions comprising from about 22 to about 38 weight percent HFO-1234yf, trans-HFO-1234ze, or a mixture thereof; about 57.5 weight percent HFC-32; and from about 5 to about 20 weight percent HFC-152a, HFO-1243zf, or mixtures thereof, which provide low GWP replacements for R-404A.

Exemplary Embodiment 6

In a sixth exemplary embodiment of the present invention, the composition comprises three components: (A) HFO-1234yf or trans-HFO-1234ze or a mixture thereof; (B) HFC-32; and (C) HFC-152a, HFO-1243zf, or mixture thereof; wherein said composition comprises trans-HFO-1234ze; HFC-32; and HFC-152a, HFO-1243zf or mixture thereof.

For the compositions of this embodiment:

(A6) trans-HFO-1234ze content can be from about 20 weight percent to about 85 weight percent, for example, trans-HFO-1234ze can be about 20%, 21%, 22%, 23%, 24%, 25%, 26%, 27%, 28%, 29% 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, or about 85% by weight of the composition;

(B6) HFC-32 can be any number within the range of from about 10% to about 58%, for example, HFC-32 can be about 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, or about 58% by weight of the composition; and (C6) HFC-152a content can be from about 5 weight percent to about 20 weight percent, for example, HFC-152a can be about 5%, 6%, 7%, 8%, 9%, 10%, 11%, 12%, 13%, 14%, 15%, 16%, 17%, 18%, 19%, or about 20% by weight of the composition.

(D6) In an alternative embodiment, at least one saturated HFC may also be included in the compositions described above. The weight percent of said at least one saturated HFC to the total weight of the composition can be in the range of from about 0% to about 10%. The weight percent of at least one saturated HFC in the composition can be about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, and 10%.

Similarly, other numbers in between the integer numbers supra, for example, 20.1, 20.2, 20.3, 20.4, 20.5 and the like can also be included for the content of the three components described above.

It should also be understood that trans-HFO-1234ze can be within a weight percent composition range formed by any two numbers in paragraph (A6) supra. Similarly, HFC-32 can be within a weight percent composition range formed by any two numbers in paragraph (B6) supra; HFC-152a can be within a weight percent composition range formed by any two numbers in paragraphs (C6) supra, and at least one saturated HFC can be within a weight percent composition range formed by any two numbers in paragraph D6.

Of note are compositions comprising from about 20 weight percent to about 85 weight percent trans-HFO-1234ze; from about 10 weight percent to about 58 weight percent (or 57.5 weight percent) HFC-32; and from about 5 weight percent to about 20 weight percent HFC-152a.

Of particular note are compositions comprising from about 20 weight percent to about 30 weight percent trans-HFO-1234ze; about 10 weight percent HFC-32; and from about 5 weight percent to about 20 weight percent HFC-152a.

Also of particular note are compositions comprising from about 75 weight percent to about 85 weight percent trans-HFO-1234ze; about 36 weight percent HFC-32; and from about 5 weight percent to about 20 weight percent HFC-152a. Also of particular note are compositions comprising from about 44 weight percent to about 59 weight percent trans-HFO-1234ze; about 42.5 weight percent HFC-32; and from about 5 weight percent to about 20 weight percent HFC-152a.

Also of particular note are compositions comprising from about 37 weight percent to about 23 weight percent trans-HFO-1234ze; about 42.5 weight percent HFC-32; and from about 5 weight percent to about 20 weight percent HFC-152a.

Also of particular note are compositions comprising from about 23 weight percent to about 37 weight percent trans-HFO-1234ze; about 57.5 (or about 58) weight percent HFC-32; and from about 5 weight percent to about 20 weight percent HFC-152a.

Exemplary Embodiment 7

In a sixth exemplary embodiment of the present invention, the composition comprises three components: (A) HFO-1234yf or trans-HFO-1234ze or a mixture thereof; (B) HFC-32; and (C) HFC-152a, HFO-1243zf, or mixture thereof; wherein said HFO-1243zf or mixture thereof with HFC-152a is at most 20 weight percent of the total weight of said composition. But at the same time, some amount of HFO-1234yf or trans-HFO-1234ze or a mixture thereof and some amount of HFC-32 are always present in the compositions of the present invention.

For the compositions of this embodiment:

(A7) HFO-1234yf or trans-HFO-1234ze or a mixture thereof content can be from about 56 weight percent to about 72 weight percent, for example, trans-HFO-1234ze can be about 56%, 57%, 58%, 59%, 60%, 61%, 62%, 63%, 64%, 65%, 66%, 67%, 68%, 69%, 70%, 71%, or about 72% by weight of the composition;

(B7) HFC-32 can be any number within the range of from about 8% to about 39%, for example, HFC-32 can be about 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, or about 39% by weight of the composition; and (C7) HFC-152a, HFO-1243zf or mixture thereof content can be from about 5 weight percent to about 20 weight percent, for example, HFC-152a can be about 5%, 6%, 7%, 8%, 9%, 10%, 11%, 12%, 13%, 14%, 15%, 16%, 17%, 18%, 19%, or about 20% by weight of the composition.

(D7) In an alternative embodiment, at least one saturated HFC may also be included in the compositions described above. The weight percent of said at least one saturated HFC to the total weight of the composition can be in the range of from about 0% to about 10%. The weight percent of at least one saturated HFC in the composition can be about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, and 10%.

Similarly, other numbers in between the integer numbers supra, for example, 56.1, 56.2, 56.3, 56.4, 56.5 and the like can also be included for the content of the three components described above.

It should also be understood that HFO-1234yf, trans-HFO-1234ze or mixture thereof can be within a weight percent composition range formed by any two numbers in paragraph (A7) supra. Similarly, HFC-32 can be within a weight percent composition range formed by any two numbers in paragraph (B7) supra; HFC-152a can be within a weight percent composition range formed by any two numbers in paragraph (C7) supra, and at least one saturated HFC can be within a weight percent composition range formed by any two numbers in paragraph D7.

In another embodiment, a composition comprising from about 44 to 59 weight percent HFO-1234yf; about 36 weight percent HFC-32; and from about 5 to 20 weight percent HFC-152a, HFO-1243zf, or mixtures thereof, which provide low GWP replacements for R-404A.

In another embodiment, compositions comprising from about 37 to about 53 weight percent HFO-1234yf; about 42.5 weight percent HFC-32; and from about 5 to about 20 weight percent HFC-152a, HFO-1243zf, or mixtures thereof, which provide low GWP replacements for R-404A.

In another embodiment, compositions comprising from about 56 weight percent to about 72 weight percent HFO-1234yf; from about 12 weight percent to about 39 weight percent HFC-32; from 0 weight percent to about 20 weight percent HFC-152a, HFO-1243zf, or mixtures thereof, provide low GWP replacements for R-22. Also, compositions comprising from about 56 weight percent to about 72 weight percent HFO-1234yf; from about 12 weight percent to about 39 weight percent HFC-32; from 0 weight percent to about 20 weight percent HFC-152a, HFO-1243zf, or mixtures thereof, provide low GWP replacements for R-407C.

In another embodiment, compositions comprising from about 56 weight percent to about 62 weight percent HFO-1234yf; from about 8 weight percent to about 29 weight percent HFC-32; from 0 weight percent to about 10 weight percent HFC-152a; from 0 to about 20 weight percent HFO-1243zf; and about 10 weight percent HFC-134a, provide low GWP replacements for R-22. Also, compositions comprising from about 56 weight percent to about 62 weight percent HFO-1234yf; from about 8 weight percent to about 29 weight percent HFC-32; from 0 weight percent to about 10 weight percent HFC-152a; from 0 to about 20 weight percent HFO-1243zf; and about 10 weight percent HFC-134a, provide low GWP replacements for R-407C.

In another embodiment, compositions comprising from about 56 weight percent to about 72 weight percent HFO-1234yf; from about 12 weight percent to about 39 weight percent HFC-32; from 0 weight percent to about 20 weight percent HFC-152a, HFO-1243zf, or mixtures thereof, provide low GWP replacements for R-22. Also, compositions comprising from about 56 weight percent to about 72 weight percent HFO-1234yf; from about 12 weight percent to about 39 weight percent HFC-32; from 0 weight percent to about 20 weight percent HFC-152a, HFO-1243zf, or mixtures thereof, provide low GWP replacements for R-407C.

In another embodiment, compositions comprising from about 56 weight percent to about 62 weight percent HFO-1234yf; from about 8 weight percent to about 29 weight percent HFC-32; from 0 weight percent to about 10 weight percent HFC-152a; from 0 to about 20 weight percent HFO-1243zf; and about 10 weight percent HFC-134a, provide low GWP replacements for R-22. Also, compositions comprising from about 56 weight percent to about 62 weight percent HFO-1234yf; from about 8 weight percent to about 29 weight percent HFC-32; from 0 weight percent to about 10 weight percent HFC-152a; from 0 to about 20 weight percent HFO-1243zf; and about 10 weight percent HFC-134a, provide low GWP replacements for R-407C.

Other Preferred Embodiments

In a preferred embodiment, in the compositions described supra, said at least one saturated HFC is HFC-134a.

In a further preferred embodiment, in the compositions described supra comprising either of the three components or the four components, the cooling capacity of the composition is at least 75% of the cooling capacity of at least one refrigerant selected from the group consisting of existing refrigerants.

By "existing refrigerants" is meant at least one refrigerant selected from R-134a, R-22, R-407C, and R-404A. In a preferred embodiment, the existing refrigerant to be replaced is R-134a, R-22, R-407C, R407A, R407F, R507, R422A, R422D, R417A, R437A, R438A, and R-404A. The cooling capacity can be about 75%, 76%, 77%, 78%, 79%, 89%, 81%, 82%, 83%, 84%, 85%, 86%, 87%, 88%, 89%, 90%, 91%, 92%, 93%, 94%, 95%, 96%, 97%, 98%, 99%, 100%, 101%, 102% 103%, 104%, 105%, 106%, 107%, 108%, 109%, 110%, 11%, 112%, 113%, 114%, 115%, 116%, 1175, 118%, 119%, 120%, 121%, 122%, 123%, 124%, 125%, 126, 127%, 128%, 129%, or about 130%.

For example, a composition comprising from about 75 to about 85 weight percent HFO-1234yf or trans-HFO-1234ze or a mixture thereof, about 10 weight percent HFC-32, and from about 5 to about 15 weight percent HFC-152a exhibits cooling capacity that is 125% of the cooling capacity of R-134a. In another example, composition comprising from about 58 to about 73.5 weight percent HFO-1234yf or trans-HFO-1234ze or a mixture thereof, about 21.5 weight percent HFC-32, and from about 5 to about 20 weight percent HFC-152a exhibits cooling capacity that is from 90-95% of the cooling capacity of R-22 and R-407C. Similarly, a composition comprising about 59 weight percent HFO-1234yf or trans-HFO-1234ze or a mixture thereof, about 36 weight percent HFC-32 and about 5 weight percent HFC-152a exhibits a cooling capacity that is about 103% of the cooling capacity of R-404A. In another example, composition comprising from about 22 to about 38 weight percent HFO-1234yf or trans-HFO-1234ze or a mixture thereof, about 57.5 weight percent HFC-32 and from about 5 to about 20 weight percent HFC-152a exhibits a cooling capacity that is 114-121% of the cooling capacity of R-404A.

In another preferred embodiment, compositions of the present invention comprising either the three components or more than three components, have been found to provide reduced GWP as compared to existing refrigerants such as R-134a, R-22, R-407C, and R-404A.

For example, a composition comprising from about 56 to about 62 weight percent HFO-1234yf or trans-HFO-1234ze or a mixture thereof, from about 23 to about 29 weight percent HFC-32, and from 14 to 16 weight percent HFC-152a has a GWP in the range of 150-300 as compared to a GWP of 1430 for R-22, R-407C, and R-134a, and a GWP of 3922 for R-404A. In another example, composition comprising from about 75 to about 85 weight percent HFO-1234yf or trans-HFO-1234ze or a mixture thereof, about 10 weight percent HFC-32, and from about 5 to about 15 weight percent HFC-152a exhibits a GWP number in the range of 70-90. In yet another example, a composition comprising from about 58 to about 73.5 weight percent HFO-1234yf or trans-HFO-1234ze or a mixture thereof, about 21.5 weight percent HFC-32, and from about 5 to about 20 weight percent HFC-152a exhibits a GWP number of 150-175. Similarly, a composition comprising about 59 weight percent HFO-1234yf or trans-HFO-1234ze or a mixture thereof, about 36 weight percent HFC-32 and about 5 weight percent HFC-152a exhibits a GWP number of about 252. In another example, composition comprising from about 22 to about 38 weight percent HFO-1234yf or trans-HFO-1234ze or a mixture thereof, about 57.5 weight percent HFC-32 and from about 5 to about 20 weight percent HFC-152a exhibits a GWP number in the range of 396-414.

In a preferred composition of the above embodiment, the HFC-152a is in the range of from about 14 weight percent to about 16 weight percent.

Other preferred embodiments include (i) from 56 to about 69 weight percent HFO-1234yf or trans-HFO-1234ze or a mixture thereof, 26-39 weight percent HFC-32, and from about 4 to about 6 weight percent HFC-152a; (ii) from about 56 to about 62 weight percent HFO-1234yf or trans-HFO-1234ze or a mixture thereof, from about 28 to about 34 weight percent HFC-32, and (iii) from about 9 to about 11 weight percent HFC-152a; and (iv) from about 56 to about 62 weight percent HFO-1234yf or trans-HFO-1234ze or a mixture thereof, 23-29 weight percent HFC-32, and from 14 to 16 weight percent HFC-152a.

In a further preferred embodiment, in the compositions described supra, the ratio of HFO-1234yf or trans-HFO-1234ze or a mixture thereof to HFC-152a is in the range of from about 1 to about 20. The ratio can be about 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, 12.0, 12.1, 12.2, 12.3, 12.4, 12.5, 12.6, 12.7, 12.8, 12.9, 13.0, 13.1, 13.2, 13.3, 13.4, 13.5, 13.6, 13.7, 13.8, 13.9, 14.0, 14.1, 14.2, 14.3, 14.4, 14.5, 14.6, 14.7, 14.8, 14.9, 15.0, 15.1, 15.2, 15.3, 15.4, 15.5, 15.6, 15.7, 15.8, 15.9, 16.0, 16.1, 16.2, 16.3, 16.4, 16.5, 16.6, 16.7, 16.8, 16.9, 17.0, 17.1, 17.2, 17.3, 17.4, 17.5, 17.6, 17.7, 17.8, 17.9, 18.0, 18.1, 18.2, 18.3, 18.4, 18.5, 18.6, 18.7, 18.9, 19.0, 19.1, 19.2, 19.3, 19.4, 19.5, 19.6, 19.7, 19.8, 19.9, or 20.0.

In a preferred composition of the present invention, in compositions described above, it has been found, surprisingly, that in a narrow range of HFC-152a, of from about 14.5 weight percent to about 15.5 weight percent, the compositions (three-component or more-than-three-component) have cooling capacity within ±25% of many of the existing refrigerants, particularly, R-22, R-404A, R-134a, and R-407C.

The present invention relates to azeotropic, near azeotropic and non-azeotropic compositions.

Compositions with higher capacity than the refrigerant being replaced provide reduced carbon fingerprint by allowing a lower charge size (less refrigerant will be necessary to achieve the same cooling effect). Therefore, even with a higher GWP such compositions may provide a net reduced environmental impact. Additionally, new equipment may be designed to provide even greater energy efficiency improvements, thus also minimizing the environmental impact of using a new refrigerant.

In some embodiments, in addition to tetrafluoropropene, difluoromethane, and 1,1-difluoroethane, the compositions may comprise optional other components.

In some embodiments, the optional other components (also referred to herein as additives) in the compositions disclosed herein may comprise one or more components selected from the group consisting of lubricants, dyes (including UV dyes), solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof. Indeed, many of these optional other components fit into one or more of these categories and may have qualities that lend themselves to achieve one or more performance characteristic.

In some embodiments, one or more additive present in small amounts relative to the overall composition. In some embodiments, the amount of additive(s) concentration in the disclosed compositions is from less than about 0.1 weight percent to as much as about 5 weight percent of the total composition. In some embodiments of the present invention, the additives are present in the disclosed compositions in an amount between about 0.1 weight percent to about 3.5 weight percent of the total composition. The additive component(s) selected for the disclosed composition is selected on the basis of the utility and/or individual equipment components or the system requirements.

In some embodiments, the lubricant is a mineral oil lubricant. In some embodiments, the mineral oil lubricant is selected from the group consisting of paraffins (including straight carbon chain saturated hydrocarbons, branched carbon chain saturated hydrocarbons, and mixtures thereof), naphthenes (including saturated cyclic and ring structures), aromatics (those with unsaturated hydrocarbons containing one or more ring, wherein one or more ring is characterized by alternating carbon-carbon double bonds) and non-hydrocarbons (those molecules containing atoms such as sulfur, nitrogen, oxygen and mixtures thereof), and mixtures and combinations of thereof.

Some embodiments may contain one or more synthetic lubricant. In some embodiments, the synthetic lubricant is selected from the group consisting of alkyl substituted aromatics (such as benzene or naphthalene substituted with linear, branched, or mixtures of linear and branched alkyl groups, often generically referred to as alkylbenzenes), synthetic paraffins and napthenes, poly (alpha olefins), polyglycols (including polyalkylene glycols), dibasic acid esters, polyesters, neopentyl esters, polyvinyl ethers (PVEs), silicones, silicate esters, fluorinated compounds, phosphate esters, polycarbonates and mixtures thereof, meaning mixtures of the any of the lubricants disclosed in this paragraph.

The lubricants as disclosed herein may be commercially available lubricants. For instance, the lubricant may be paraffinic mineral oil, sold by BVA Oils as BVM 100 N, naphthenic mineral oils sold by Crompton Co. under the trademarks Suniso® 1GS, Suniso® 3GS and Suniso® 5GS, naphthenic mineral oil sold by Pennzoil under the trademark Sontex® 372LT, naphthenic mineral oil sold by Calumet Lubricants under the trademark Calumet® RO-30, linear alkylbenzenes sold by Shrieve Chemicals under the trademarks Zerol® 75, Zerol® 150 and Zerol® 500 and branched alkylbenzene sold by Nippon Oil as HAB 22, polyol esters (POEs) sold under the trademark Castrol® 100 by Castrol, United Kingdom, polyalkylene glycols (PAGs) such as RL-488A from Dow (Dow Chemical, Midland, Mich.), and mixtures thereof, meaning mixtures of any of the lubricants disclosed in this paragraph.

The lubricants used with the present invention may be designed for use with hydrofluorocarbon refrigerants and may be miscible with compositions as disclosed herein under compression refrigeration and air-conditioning apparatus' operating conditions. In some embodiments, the lubricants are selected by considering a given compressor's requirements and the environment to which the lubricant will be exposed.

In the compositions of the present invention including a lubricant, the lubricant is present in an amount of less than 5.0 weight % to the total composition. In other embodiments, the amount of lubricant is between about 0.1 and 3.5 weight % of the total composition.

Notwithstanding the above weight ratios for compositions disclosed herein, it is understood that in some heat transfer systems, while the composition is being used, it may acquire additional lubricant from one or more equipment components of such heat transfer system. For example, in some refrigeration, air conditioning and heat pump systems, lubricants may be charged in the compressor and/or the compressor lubricant sump. Such lubricant would be in addition to any lubricant additive present in the refrigerant in such a system. In use, the refrigerant composition when in the compressor may pick up an amount of the equipment lubricant to change the refrigerant-lubricant composition from the starting ratio.

In such heat transfer systems, even when the majority of the lubricant resides within the compressor portion of the system, the entire system may contain a total composition with as much as about 75 weight percent to as little as about 1.0 weight percent of the composition being lubricant. In some systems, for example supermarket refrigerated display cases, the system may contain about 3 weight percent lubricant (over and above any lubricant present in the refrigerant composition prior to charging the system) and 97 weight percent refrigerant. In another embodiment, in some systems, for example mobile air conditioning systems, the system may contain about 20 weight percent lubricant (over and above any lubricant present in the refrigerant composition prior to charging the system) and about 80 weight percent refrigerant.

The additive used with the compositions of the present invention may include at least one dye. The dye may be at least one ultra-violet (UV) dye. The UV dye may be a fluorescent dye. The fluorescent dye may be selected from the group consisting of naphthalimides, perylenes, coumarins, anthracenes, phenanthracenes, xanthenes, thioxanthenes, naphthoxanthenes, fluoresceins, and derivatives of said dye, and combinations thereof, meaning mixtures of any of the foregoing dyes or their derivatives disclosed in this paragraph.

In some embodiments, the disclosed compositions contain from about 0.001 weight percent to about 1.0 weight percent UV dye. In other embodiments, the UV dye is present in an amount of from about 0.005 weight percent to about 0.5 weight percent; and in other embodiments, the UV dye is present in an amount of from 0.01 weight percent to about 0.25 weight percent of the total composition.

UV dye is a useful component for detecting leaks of the composition by permitting one to observe the fluorescence of the dye at or in the vicinity of a leak point in an apparatus (e.g., refrigeration unit, air-conditioner or heat pump). The UV emission, e.g., fluorescence from the dye may be observed under an ultra-violet light. Therefore, if a composition containing such a UV dye is leaking from a given point in an apparatus, the fluorescence can be detected at the leak point, or in the vicinity of the leak point.

The additive which may be used with the compositions of the present invention may include at least one solubilizing agent selected to improve the solubility of one or more dye in the disclosed compositions. In some embodiments, the weight ratio of dye to solubilizing agent ranges from about 99:1 to about 1:1. The solubilizing agents include at least one compound selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers and 1,1,1-trifluoroalkanes and mixtures thereof, meaning mixtures of any of the solubilizing agents disclosed in this paragraph.

In some embodiments, at least one compatibilizer is selected to improve the compatibility of one or more lubricant with the disclosed compositions. The compatibilizer may be selected from the group consisting of hydrocarbons, hydrocarbon ethers, polyoxyalkylene glycol ethers (such as dipropylene glycol dimethyl ether), amides, nitriles, ketones, chlorocarbons (such as methylene chloride, trichloroethylene, chloroform, or mixtures thereof), esters, lactones, aromatic ethers, fluoroethers, 1,1,1-trifluoroalkanes, and mixtures thereof, meaning mixtures of any of the compatibilizers disclosed in this paragraph.

The solubilizing agent and/or compatibilizer may be selected from the group consisting of hydrocarbon ethers consisting of the ethers containing only carbon, hydrogen and oxygen, such as dimethyl ether (DME) and mixtures thereof, meaning mixtures of any of the hydrocarbon ethers disclosed in this paragraph.

The compatibilizer may be linear or cyclic aliphatic or aromatic hydrocarbon compatibilizer containing from 3 to 15 carbon atoms. The compatibilizer may be at least one hydrocarbon, which may be selected from the group consisting of at least propane, n-butane, isobutane, pentanes, hexanes, octanes, nonane, and decanes, among others. Commercially available hydrocarbon compatibilizers include but are not limited to those from Exxon Chemical (USA) sold under the trademarks Isopar® H, a mixture of undecane ($C_{11}$) and dodecane ($C_{12}$) (a high purity $C_{11}$ to $C_{12}$ isoparaffinic), Aromatic 150 (a $C_9$ to $C_{11}$ aromatic) (Aromatic 200 (a $C_9$ to $C_{15}$ aromatic) and Naptha 140 (a mixture of $C_5$ to $C_{11}$ paraffins, naphthenes and aromatic hydrocarbons) and mixtures thereof, meaning mixtures of any of the hydrocarbons disclosed in this paragraph.

The additive may alternatively be at least one polymeric compatibilizer. The polymeric compatibilizer may be a random copolymer of fluorinated and non-fluorinated acrylates, wherein the polymer comprises repeating units of at least one monomer represented by the formulae $CH_2$=C($R^1$)$CO_2R^2$, $CH_2$=C($R^3$)$C_6H_4R^4$, and $CH_2$=C($R^5$)$C_6H_4XR^6$, wherein X is oxygen or sulfur; $R^1$, $R^3$, and $R^5$ are independently selected from the group consisting of H and $C_1$-$C_4$ alkyl radicals; and $R^2$, $R^4$, and $R^6$ are independently selected from the group consisting of carbon-chain-based radicals containing C, and F, and may further contain H, Cl, ether oxygen, or sulfur in the form of thioether, sulfoxide, or sulfone groups and mixtures thereof. Examples of such polymeric compatibilizers include those commercially available from E. I. du Pont de Nemours and Company (Wilmington, Del., 19898, USA) under the trademark Zonyl® PHS. Zonyl® PHS is a random copolymer made by polymerizing 40 weight percent $CH_2$=C($CH_3$)

$CO_2CH_2CH_2(CF_2CF_2)_mF$ (also referred to as Zonyl® fluoromethacrylate or ZFM) wherein m is from 1 to 12, primarily 2 to 8, and 60 weight percent lauryl methacrylate $(CH_2=C(CH_3)CO_2(CH_2)_{11}CH_3$, also referred to as LMA).

In some embodiments, the compatibilizer component contains from about 0.01 to 30 weight percent (based on total amount of compatibilizer) of an additive which reduces the surface energy of metallic copper, aluminum, steel, or other metals and metal alloys thereof found in heat exchangers in a way that reduces the adhesion of lubricants to the metal. Examples of metal surface energy reducing additives include those commercially available from DuPont under the trademarks Zonyl® FSA, Zonyl® FSP, and Zonyl® FSJ.

The additive which may be used with the compositions of the present invention may be a metal surface deactivator. The metal surface deactivator is selected from the group consisting of areoxalyl bis (benzylidene) hydrazide (CAS reg no. 6629-10-3), N,N'-bis(3,5-di-tert-butyl-4-hydroxyhydrocinnamoylhydrazine (CAS reg no. 32687-78-8), 2,2'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof, meaning mixtures of any of the metal surface deactivators disclosed in this paragraph.

The additive used with the compositions of the present invention may alternatively be a stabilizer selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof, meaning mixtures of any of the stabilizers disclosed in this paragraph.

The stabilizer may be selected from the group consisting of tocopherol; hydroquinone; t-butyl hydroquinone; monothiophosphates; and dithiophosphates, commercially available from Ciba Specialty Chemicals, Basel, Switzerland, hereinafter "Ciba", under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168 and Tris-(di-tert-butylphenyl)phosphite, commercially available from Ciba under the trademark Irgafos® OPH; (Di-n-octyl phosphite); and iso-decyl diphenyl phosphite, commercially available from Ciba under the trademark Irgafos® DDPP; trialkyl phosphates, such as trimethyl phosphate, triethylphosphate, tributyl phosphate, trioctyl phosphate, and tri(2-ethylhexyl)phosphate; triaryl phosphates including triphenyl phosphate, tricresyl phosphate, and trixylenyl phosphate; and mixed alkyl-aryl phosphates including isopropylphenyl phosphate (IPPP), and bis(t-butylphenyl)phenyl phosphate (TBPP); butylated triphenyl phosphates, such as those commercially available under the trademark Syn-O-Ad® including Syn-O-Ad® 8784; tert-butylated triphenyl phosphates such as those commercially available under the trademark Durad®620; isopropylated triphenyl phosphates such as those commercially available under the trademarks Durad® 220 and Durad®110; anisole; 1,4-dimethoxybenzene; 1,4-diethoxybenzene; 1,3,5-trimethoxybenzene; myrcene, alloocimene, limonene (in particular, d-limonene); retinal; pinene; menthol; geraniol; farnesol; phytol; Vitamin A; terpinene; delta-3-carene; terpinolene; phellandrene; fenchene; dipentene; caratenoids, such as lycopene, beta carotene, and xanthophylls, such as zeaxanthin; retinoids, such as hepaxanthin and isotretinoin; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and mixtures and combinations thereof.

The additive used with the compositions of the present invention may alternatively be an ionic liquid stabilizer. The ionic liquid stabilizer may be selected from the group consisting of organic salts that are liquid at room temperature (approximately 25° C.), those salts containing cations selected from the group consisting of pyridinium, pyridazinium, pyrimidinium, pyrazinium, imidazolium, pyrazolium, thiazolium, oxazolium and triazolium and mixtures thereof; and anions selected from the group consisting of $[BF_4]-$, $[PF_6]-$, $[SbF_6]-$, $[CF_3SO_3]-$, $[HCF_2CF_2SO_3]-$, $[CF_3HFCCF_2SO_3]-$, $[HCClFCF_2SO_3]-$, $[(CF_3SO_2)_2N]-$, $[(CF_3CF_2SO_2)_2N]-$, $[(CF_3SO_2)_3C]-$, $[CF_3CO_2]-$, and F— and mixtures thereof. In some embodiments, ionic liquid stabilizers are selected from the group consisting of emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

In some embodiments, the stabilizer may be a hindered phenol, which is any substituted phenol compound, including phenols comprising one or more substituted or cyclic, straight chain, or branched aliphatic substituent group, such as, alkylated monophenols including 2,6-di-tert-butyl-4-methylphenol; 2,6-di-tert-butyl-4-ethylphenol; 2,4-dimethyl-6-tertbutylphenol; tocopherol; and the like, hydroquinone and alkylated hydroquinones including t-butyl hydroquinone, other derivatives of hydroquinone; and the like, hydroxylated thiodiphenyl ethers, including 4,4'-thiobis(2-methyl-6-tert-butylphenol); 4,4'-thiobis(3-methyl-6-tertbutylphenol); 2,2'-thiobis(4methyl-6-tert-butylphenol); and the like, alkylidene-bisphenols including: 4,4'-methylenebis(2,6-di-tert-butylphenol); 4,4'-bis(2,6-di-tert-butylphenol); derivatives of 2,2'- or 4,4-biphenoldiols; 2,2'-methylenebis(4-ethyl-6-tertbutylphenol); 2,2'-methylenebis(4-methyl-6-tertbutylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol; 2,2'-methylenebis(4-methyl-6-cyclohexylphenol, 2,2- or 4,4-biphenyldiols including 2,2'-methylenebis(4-ethyl-6-tert-butylphenol); butylated hydroxytoluene (BHT, or 2,6-di-tert-butyl-4-methylphenol), bisphenols comprising heteroatoms including 2,6-di-tert-alpha-dimethylamino-p-cresol, 4,4-thiobis(6-tert-butyl-m-cresol); and the like; acylaminophenols; 2,6-di-tert-butyl-4(N,N'-dimethylaminomethylphenol); sulfides including; bis(3-methyl-4-hydroxy-5-tert-butylbenzyl)sulfide; bis(3,5-di-tert-butyl-4-hydroxybenzyl) sulfide and mixtures thereof, meaning mixtures of any of the phenols disclosed in this paragraph.

The additive which is used with compositions of the present invention may alternatively be a tracer. The tracer may be two or more tracer compounds from the same class of compounds or from different classes of compounds. In some embodiments, the tracer is present in the compositions at a total concentration of about 50 parts per million by weight (ppm) to about 1000 ppm, based on the weight of the total composition. In other embodiments, the tracer is present at a total concentration of about 50 ppm to about 500 ppm. Alternatively, the tracer is present at a total concentration of about 100 ppm to about 300 ppm.

The tracer may be selected from the group consisting of hydrofluorocarbons (HFCs), deuterated hydrofluorocarbons, perfluorocarbons, fluoroethers, brominated compounds, iodated compounds, alcohols, aldehydes and ketones, nitrous oxide and combinations thereof. Alternatively, the tracer may be selected from the group consisting of fluoroethane, 1,1,1-trifluoroethane, 1,1,1,3,3,3-hexafluoropropane, 1,1,1,2,3,3,3-heptafluoropropane, 1,1,1,3,3-pentafluoropropane, 1,1,1,3,3-pentafluorobutane, 1,1,1,2,3,4,4,5,5,5-decafluoropentane, 1,1,1,2,2,3,4,5,5,6,6,7,7,7-tridecafluoroheptane, iodotrifluoromethane, deuterated hydrocarbons, deuterated hydrofluorocarbons, perfluorocarbons, fluoroethers, brominated compounds, iodated compounds, alcohols, aldehydes, ketones, nitrous oxide ($N_2O$) and mixtures thereof. In some embodiments, the tracer is a blend containing two or more hydrofluorocarbons, or one hydrofluorocarbon in combination with one or more perfluorocarbons.

The tracer may be added to the compositions of the present invention in predetermined quantities to allow detection of any dilution, contamination or other alteration of the composition.

The additive which may be used with the compositions of the present invention may alternatively be a perfluoropolyether. A common characteristic of perfluoropolyethers is the presence of perfluoroalkyl ether moieties. Perfluoropolyether is synonymous to perfluoropolyalkylether. Other synonymous terms frequently used include "PFPE", "PFAE", "PFPE oil", "PFPE fluid", and "PFPAE". In some embodiments, the perfluoropolyether has the formula of $CF_3$—$(CF_2)_2$—O—[CF($CF_3$)—$CF_2$—O]j'-R'f, and is commercially available from DuPont under the trademark Krytox®. In the immediately preceding formula, j' is 2-100, inclusive and R'f is $CF_2CF_3$, a $C_3$ to $C_6$ perfluoroalkyl group, or combinations thereof.

Other PFPEs, commercially available from Ausimont of Milan, Italy, and Montedison S.p.A., of Milan, Italy, under the trademarks Fomblin® and Galden®, respectively, and produced by perfluoroolefin photooxidation, can also be used.

PFPE commercially available under the trademark Fomblin®-Y can have the formula of $CF_3O(CF_2CF(CF_3)$—O—$)_m(CF_2$—O—$)_{n'}$—$R_{1f}$. Also suitable is $CF_3O[CF_2CF(CF_3)O]_m(CF_2CF_2O)_o(CF_2O)_{n'}$—$R_{1f}$. In the formulae $R_{1f}$ is $CF_3$, $C_2F_5$, $C_3F_7$, or combinations of two or more thereof; (m'+n') is 8-45, inclusive; and m/n is 20-1000, inclusive; o' is 1; (m'+n'+o') is 8-45, inclusive; m'/n' is 20-1000, inclusive.

PFPE commercially available under the trademark Fomblin®-Z can have the formula of $CF_3O(CF_2CF_2$—O—$)_{p'}$ $(CF_2$—O$)_qCF_3$ where (p'+q') is 40-180 and p'/q' is 0.5-2, inclusive.

Another family of PFPE, commercially available under the trademark Demnum™ from Daikin Industries, Japan, can also be used. It can be produced by sequential oligomerization and fluorination of 2,2,3,3-tetrafluorooxetane, yielding the formula of F—$[(CF_2)_3$—O$]_{t'}$—$R_{2f}$ where $R_{2f}$ is $CF_3$, $C_2F_5$, or combinations thereof and t' is 2-200, inclusive.

In some embodiments, the PFPE is unfunctionalized. In an unfunctionalized perfluoropolyether, the end group can be branched or straight chain perfluoroalkyl radical end groups. Examples of such perfluoropolyethers can have the formula of $C_{r'}F_{(2r'+1)}$-A-$C_{r'}F_{(2r'+1)}$ in which each r' is independently 3 to 6; A can be O—$(CF(CF_3)CF_2$—O$)_{w'}$, O—$(CF_2$—O$)_x(CF_2CF_2$—O$)_{y'}$, O—$(C_2F_4$—O$)_{w'}$, O—$(C_2F_4$—O$)_x(C_3F_6$—O$)_{y'}$, O—$(CF(CF_3)CF_2$—O$)_{x'}$ $(CF_2$—O$)_{y'}$, O—$(CF_2CF_2CF_2$—O$)_{w'}$, O—$(CF(CF_3)CF_2$—O$)_x(CF_2CF_2$—O$)_{y'}$—$(CF_2$—O$)_{z'}$, or combinations of two or more thereof; preferably A is O—$(CF(CF_3)CF_2$—O$)_{w'}$, O—$(C_2F_4$—O$)_{w'}$, O—$(C_2F_4$—O$)_x(C_3F_6$—O$)_{y'}$, O—$(CF_2CF_2CF_2$—O$)_{w'}$, or combinations of two or more thereof; w' is 4 to 100; x' and y' are each independently 1 to 100. Specific examples include, but are not limited to, F(CF($CF_3$)—$CF_2$—O$)_9$—$CF_2CF_3$, F(CF($CF_3$)—$CF_2$—O$)_9$—CF($CF_3$)$_2$, and combinations thereof. In such PFPEs, up to 30% of the halogen atoms can be halogens other than fluorine, such as, for example, chlorine atoms.

In other embodiments, the two end groups of the perfluoropolyether, independently, may be functionalized by the same or different groups. A functionalized PFPE is a PFPE wherein at least one of the two end groups of the perfluoropolyether has at least one of its halogen atoms substituted by a group selected from esters, hydroxyls, amines, amides, cyanos, carboxylic acids, sulfonic acids or combinations thereof.

In some embodiments, representative ester end groups include —$COOCH_3$, —$COOCH_2CH_3$, —$CF_2COOCH_3$, —$CF_2COOCH_2CH_3$, —$CF_2CF_2COOCH_3$, —$CF_2CF_2COOCH_2CH_3$, —$CF_2CH_2COOCH_3$, —$CF_2CF_2CH_2COOCH_3$, —$CF_2CH_2CH_2COOCH_3$, —$CF_2CF_2CH_2CH_2COOCH_3$.

In some embodiments, representative hydroxyl end groups include —$CF_2OH$, —$CF_2CF_2OH$, —$CF_2CH_2OH$, —$CF_2CF_2CH_2OH$, —$CF_2CH_2CH_2OH$, —$CF_2CF_2CH_2CH_2OH$.

In some embodiments, representative amine end groups include —$CF_2NR^1R^2$, —$CF_2CF_2NR^1R^2$, —$CF_2CH_2NR^1R^2$, —$CF_2CF_2CH_2NR^1R^2$, —$CF_2CH_2CH_2NR^1R^2$, —$CF_2CF_2CH_2CH_2NR^1R^2$, wherein $R^1$ and $R^2$ are independently H, $CH_3$, or $CH_2CH_3$.

In some embodiments, representative amide end groups include —$CF_2C(O)NR^1R^2$, —$CF_2CF_2C(O)NR^1R^2$, —$CF_2CH_2C(O)NR^1R^2$, —$CF_2C$ $F_2CH_2C(O)NR^1R^2$, —$CF_2CH_2CH_2C(O)NR^1R^2$, —$CF_2CF_2CH_2CH_2C(O)NR^1R^2$, wherein $R^1$ and $R^2$ are independently H, $CH_3$, or $CH_2CH_3$.

In some embodiments, representative cyano end groups include —$CF_2CN$, —$CF_2CF_2CN$, —$CF_2CH_2CN$, —$CF_2CF_2CH_2CN$, —$CF_2CH_2CH_2CN$, —$CF_2CF_2CH_2CH_2CN$.

In some embodiments, representative carboxylic acid end groups include —$CF_2COOH$, —$CF_2CF_2COOH$, —$CF_2CH_2COOH$, —$CF_2CF_2CH_2COOH$, —$CF_2CH_2CH_2COOH$, —$CF_2CF_2CH_2CH_2COOH$.

In some embodiments, the sulfonic acid end groups is selected from the group consisting of —$S(O)(O)OR^3$, —$S(O)(O)R^4$, —$CF_2OS(O)(O)OR^3$, —$CF_2CF_2OS(O)(O)OR^3$, —$CF_2CH_2OS(O)(O)OR^3$, —$CF_2CF_2CH_2OS(O)(O)OR^3$, —$CF_2CH_2CH_2OS(O)(O)OR^3$, —$CF_2CF_2CH_2CH_2OS(O)(O)OR^3$, —$CF_2S(O)(O)OR^3$, —$CF_2CF_2S(O)(O)O\ R^3$, —$CF_2CH_2S(O)(O)OR^3$, —$CF_2CF_2CH_2S(O)(O)OR^3$, —$CF_2CH_2CH_2S(O)(O)O\ R^3$, —$CF_2CF_2CH_2CH_2S(O)(O)OR^3$, —$CF_2OS(O)(O)R^4$, —$CF_2CF_2OS(O)(O)R^4$, —$CF_2CH_2OS(O)(O)R^4$, —$CF_2CF_2CH_2OS(O)(O)R^4$, —$CF_2CH_2CH_2OS(O)(O)R^4$, —$CF_2CF_2CH_2CH_2OS(O)(O)R^4$, wherein $R^3$ is H, $CH_3$, $CH_2CH_3$, $CH_2CF_3$, $CF_3$, or $CF_2CF_3$, $R^4$ is $CH_3$, $CH_2CH_3$, $CH_2CF_3$, $CF_3$, or $CF_2CF_3$.

The additives may be members of the triaryl phosphate family of EP (extreme pressure) lubricity additives, such as butylated triphenyl phosphates (BTPP), or other alkylated triaryl phosphate esters, such as those sold under the trademark Syn-O-Ad® 8478 from Akzo Chemicals, tricresyl phosphates and related compounds. Additionally, the metal dialkyl dithiophosphates (e.g., zinc dialkyl dithiophosphate (or ZDDP), including the commercially available Lubrizol 1375 and other members of this family of chemicals is used in compositions of the disclosed compositions. Other antiwear additives include natural product oils and asymmetrical polyhydroxyl lubrication additives, such as the commercially available Synergol TMS (International Lubricants).

In some embodiments, stabilizers such as antioxidants, free radical scavengers, and water scavengers and mixtures thereof are included. Such additives in this category can include, but are not limited to, butylated hydroxy toluene (BHT), epoxides, and mixtures thereof. Corrosion inhibitors include dodecyl succinic acid (DDSA), amine phosphate (AP), oleoyl sarcosine, imidazone derivatives and substituted sulfonates.

In one embodiment, the compositions disclosed herein may be prepared by any convenient method to combine the desired amounts of the individual components. A preferred method is to weigh the desired component amounts and thereafter combine the components in an appropriate vessel. Agitation may be used, if desired.

In another embodiment, the compositions disclosed herein may be prepared by a method comprising (i) reclaiming a volume of one or more components of the refrigerant compositions disclosed herein from at least one refrigerant container, (ii) removing impurities sufficiently to enable reuse of said one or more of the reclaimed components, (iii) and optionally, combining all or part of said reclaimed volume of components with at least one additional refrigerant composition or component in order to produce a composition described in the various embodiments herein.

A refrigerant container may be any container in which is stored a refrigerant blend composition that has been used in a refrigeration apparatus, air-conditioning apparatus or heat pump apparatus. Said refrigerant container may be the refrigeration apparatus, air-conditioning apparatus or heat pump apparatus in which the refrigerant blend was used. Additionally, the refrigerant container may be a storage container for collecting reclaimed refrigerant blend components, including but not limited to pressurized gas cylinders.

Residual refrigerant means any amount of refrigerant blend or refrigerant blend component that may be moved out of the refrigerant container by any method known for transferring refrigerant blends or refrigerant blend components.

Impurities may be any component that is in the refrigerant blend or refrigerant blend component due to its use in a refrigeration apparatus, air-conditioning apparatus or heat pump apparatus. Such impurities include but are not limited to refrigeration lubricants, being those described earlier herein, particulates including but not limited to metal, metal salt or elastomer particles, that may have come out of the refrigeration apparatus, air-conditioning apparatus or heat pump apparatus, and any other contaminants that may adversely affect the performance of the refrigerant blend composition.

Such impurities may be removed sufficiently to allow reuse of the refrigerant blend or refrigerant blend component without adversely affecting the performance or equipment within which the refrigerant blend or refrigerant blend component will be used.

It may be necessary to provide additional refrigerant blend or refrigerant blend component to the residual refrigerant blend or refrigerant blend component in order to produce a composition that meets the specifications required for a given product. For instance, if a refrigerant blend has 3 components in a particular weight percentage range, it may be necessary to add one or more of the components in a given amount in order to restore the composition to within the specification limits.

Compositions of the present invention have zero ozone depletion potential and low global warming potential (GWP). Additionally, the compositions of the present invention will have global warming potentials that are less than many hydrofluorocarbon refrigerants currently in use. One aspect of the present invention is to provide a refrigerant with a global warming potential of less than 1000, less than 700, less than 500, less than 400, less than 300, or less than 150, less than 100.

Methods of Use

The compositions disclosed herein are useful as heat transfer compositions, aerosol propellants, foaming agents, blowing agents, solvents, cleaning agents, carrier fluids, displacement drying agents, buffing abrasion agents, polymerization media, expansion agents for polyolefins and polyurethane, gaseous dielectrics and power cycle working fluids. Additionally, in liquid or gaseous form, the disclosed compositions may act as working fluids used to carry heat from a heat source to a heat sink. Such heat transfer compositions may also be useful as refrigerants in a cycle wherein the fluid undergoes phase changes; that is, from a liquid to a gas and back or vice versa.

In many applications, some embodiments of the disclosed compositions are useful as refrigerants and provide at least comparable cooling performance (meaning cooling capacity and energy efficiency) as the refrigerant for which a replacement is being sought.

In some embodiments, the compositions disclosed herein are useful for any positive displacement compressor system designed for any number of heat transfer compositions. Additionally, many of the compositions disclosed are useful in new equipment utilizing positive displacement compressors to provide similar performance to the aforementioned refrigerants.

In one embodiment, disclosed herein is a process to produce cooling comprising condensing a composition as disclosed herein and thereafter evaporating said composition in the vicinity of a body to be cooled.

In another embodiment, disclosed herein is a process to produce heat comprising condensing a composition as disclosed herein in the vicinity of a body to be heated and thereafter evaporating said composition.

In some embodiments, the use of the above disclosed compositions includes using the composition as a heat transfer composition in a process for producing cooling, wherein the composition is first cooled and stored under pressure and when exposed to a warmer environment, the composition absorbs some of the ambient heat, expands, and the warmer environment is thusly cooled.

In some embodiments, the compositions as disclosed herein may be useful in particular in air conditioning applications including but not limited to chillers, high temperature heat pumps, residential, commercial or industrial air conditioning systems (including residential heat pumps), and including window, ductless, ducted, packaged terminal, chillers, and those exterior but connected to the building such as rooftop systems.

In some embodiments, the compositions as disclosed herein may be useful in particular in refrigeration applications including high, medium or low temperature refrigeration. High temperature refrigeration systems include those for supermarket produce sections among others. Medium temperature refrigeration systems includes supermarket and convenience store refrigerated cases for beverages, dairy and other items requiring refrigeration. Low temperature refrigeration systems include supermarket and convenience store freezer cabinets and displays, ice machines and frozen food transport. Other specific uses such as in commercial, industrial or residential refrigerators and freezers, ice machines, self-contained coolers and freezers, supermarket rack and distributed systems, flooded evaporator chillers, direct expansion chillers, walk-in and reach-in coolers and freezers, and combination systems.

In one embodiment, a method is provided for replacing existing refrigerants, in a system designed to use said existing refrigerants, respectively, wherein said method comprises providing a composition as disclosed herein. The method may be used, wherein said existing refrigerants are selected from the group consisting of R-22, R-404A, R-407C, and R-134a.

In another embodiment, the compositions as disclosed herein may be used as replacements for refrigerants selected from the group consisting of R-22, R-404A, R-407C, and R-134a. In one embodiment, the compositions as disclosed herein may be used as replacements for R-22. The replacement may be made in a system designed to use R-22. In another embodiment, the compositions as disclosed herein may be used as replacements for R-407C. The replacement may be made in a system designed to use R-407C. In another embodiment, the compositions as disclosed herein may be used as replacements for R-404A. The replacement may be made in a system designed to use R-404A. In another embodiment, the compositions as disclosed herein may be used as replacements for R-134a. The replacement may be made in a system designed to use R-134a.

In one embodiment, compositions within about +/−10% of the cooling capacity of R-134a, R-22 or R-407C are of particular usefulness, as they may be direct drop-in replacements.

Of note are compositions comprising from about 75 to about 85 weight percent HFO-1234yf, about 10 weight percent HFC-32, and from about 5 to about 15 weight percent HFC-152a that provide low GWP replacements for R-134a with improved cooling performance.

Also of utility are compositions comprising from about 58 to about 74 weight percent HFO-1234yf; about 21.5 weight percent HFC-32; and from about 5 to about 20 weight percent HFC-152a, HFO-1243zf, or mixtures thereof; which provide low GWP replacements for R-22. Also, compositions comprising from about 58 to about 74 weight percent HFO-1234yf, about 21.5 weight percent HFC-32, and from about 5 to about 20 weight percent HFC-152a, HFO-1243zf, or mixtures thereof; provide low GWP replacements for R-407C.

Of significant utility, are compositions comprising from about 56 to about 98 weight percent HFO-1234yf or HFO-1234ze or a mixture thereof; from about 1 to about 43 weight percent HFC-32; and from about 1 to about 18 weight percent HFC-152a, HFO-1243zf, or mixtures thereof. Of note are compositions comprising from about 75 to about 85 weight percent HFO-1234yf, about 10 weight percent HFC-32, and from about 5 to about 15 weight percent HFC-152a, HFO-1243zf, or mixtures thereof; which provide low GWP replacements for R-134a.

Also of significant utility, are compositions comprising from about 56 to about 98 weight percent HFO-1234yf or HFO-1234ze or a mixture thereof; from about 1 to about 43 weight percent HFC-32; and from about 1 to about 15 weight percent HFC-152a, HFO-1243zf, or mixtures thereof.

Also of utility are compositions comprising from about 58 to about 74 weight percent HFO-1234yf; about 21.5 weight percent HFC-32; and from about 5 to about 20 weight percent HFC-152a, HFO-1243zf, or mixtures thereof, which provide low GWP replacements for R-22. Also, compositions comprising from about 58 to about 74 weight percent HFO-1234yf; about 21.5 weight percent HFC-32; and from about 5 to about 20 weight percent HFC-152a, HFO-1243zf, or mixtures thereof; provide low GWP replacements for R-407C.

Also of utility are compositions comprising from about 56 weight percent to about 72 weight percent HFO-1234yf; from about 8 weight percent to about 39 weight percent HFC-32; and from about 5 weight percent to about 20 weight percent HFC-152a, that provide low GWP replacements for R-22. Also compositions comprising from about 56 weight percent to about 72 weight percent HFO-1234yf; from about 8 weight percent to about 39 weight percent HFC-32; and from about 5 weight percent to about 20 weight percent HFC-152a, that provide low GWP replacements for R-407C.

Also of particular utility are compositions comprising from about 56 weight percent to about 62 weight percent HFO-1234yf; from about 8 weight percent to about 29 weight percent HFC-32; from about 5 weight percent to about 20 weight percent HFC-152a; and about 10 weight percent HFC-134a, that provide low GWP replacements for R-22. Also compositions comprising from about 56 weight percent to about 62 weight percent HFO-1234yf; from about 8 weight percent to about 29 weight percent HFC-32; from about 5 weight percent to about 20 weight percent HFC- 152a; and about 10 weight percent HFC-134a, that provide low GWP replacements for R-407C.

In another embodiment, a composition comprising from about 44 to about 59 weight percent HFO-1234yf; about 36 weight percent HFC-32; and from about 5 to about 20 weight percent HFC-152a, HFO-1243zf, or mixtures thereof; which provide low GWP replacements for R-404A.

In another embodiment, compositions comprising from about 37 to about 53 weight percent HFO-1234yf; about 42.5 weight percent HFC-32; and from about 5 to about 20 weight percent HFC-152a, HFO-1243zf, or mixtures thereof; which provide low GWP replacements for R-404A.

In another embodiment, compositions comprising from about 22 to about 38 weight percent HFO-1234yf; about 57.5 weight percent HFC-32; and from about 5 to about 20 weight percent HFC-152a, HFO-1243zf, or mixtures thereof, which provide low GWP replacements for R-404A.

Of particular utility, are compositions comprising from about 56 to about 98 weight percent trans-HFO-1234ze; from about 1 to about 43 weight percent HFC-32; and from about 1 to about 20 weight percent HFC-152a, HFO-1243zf, or mixtures thereof.

Also of note are compositions comprising from about 75 to about 85 weight percent trans-HFO-1234ze; about 10 weight percent HFC-32; and from about 5 to about 15 weight percent HFC-152a, HFO-1243zf, or mixtures thereof; which provide low GWP replacements for R-134a with improved cooling performance.

In another embodiment, compositions comprising from about 37 to about 53 weight percent trans-HFO-1234ze; about 42.5 weight percent HFC-32; and from about 5 to about 20 weight percent HFC-152a, HFO-1243zf, or mixtures thereof; which provide low GWP replacements for R-404A.

In another embodiment, compositions comprising from about 22 to about 38 weight percent trans-HFO-1234ze; about 57.5 weight percent HFC-32; and from about 5 to about 20 weight percent HFC-152a, HFO-1243zf, or mixtures thereof.

In one embodiment, a method is provided for replacing R-22, R-404A, R-407C, or R-134a, in a system designed to use R-22, R-404A, R-407C, or R-134a, respectively, wherein said method comprises providing a composition as disclosed herein to said system.

Additionally, in some embodiments, the disclosed compositions may function as primary refrigerants in secondary loop systems that provide cooling to remote locations by use of a secondary heat transfer fluid, which may comprise water, a glycol or carbon dioxide.

In another embodiment is provided a method for recharging a heat transfer system that contains a refrigerant to be replaced and a lubricant, said method comprising removing the refrigerant to be replaced from the heat transfer system while retaining a substantial portion of the lubricant in said system and introducing one of the compositions herein disclosed to the heat transfer system.

In another embodiment, a heat exchange system comprising a composition disclosed herein is provided, wherein said system is selected from the group consisting of air conditioners, freezers, refrigerators, water chillers, flooded evaporator chillers, direct expansion chillers, walk-in coolers, heat pumps, mobile refrigerators, mobile air conditioning units, and systems having combinations thereof.

Vapor-compression refrigeration, air-conditioning, or heat pump systems include an evaporator, a compressor, a condenser, and an expansion device. A vapor-compression cycle re-uses refrigerant in multiple steps producing a cooling effect in one step and a heating effect in a different step. The cycle can be described simply as follows. Liquid refrigerant enters an evaporator through an expansion device, and the liquid refrigerant boils in the evaporator, by withdrawing heat from the environment, at a low temperature to form a gas and produce cooling. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

In one embodiment, there is provided a heat transfer system containing a composition as disclosed herein. In another embodiment is disclosed a refrigeration, air-conditioning, or heat pump apparatus containing a composition as disclosed herein. In another embodiment, is disclosed a stationary refrigeration, air-conditioning, or heat pump apparatus containing a composition as disclosed herein. In a particular embodiment, is disclosed a medium temperature refrigeration apparatus containing the composition of the present invention. In another particular embodiment, is disclosed a low temperature refrigeration apparatus containing the composition of the present invention.

In yet another embodiment is disclosed a mobile refrigeration or air conditioning apparatus containing a composition as disclosed herein.

The compositions as disclosed herein may also be useful as power cycle working fluids in heat recovery processes, such as organic Rankine cycles. In relation to this embodiment is disclosed a process for recovering heat which comprises: (a) passing a working fluid through a first heat exchanger in communication with a process which produces heat; (b) removing said working fluid from said first heat exchanger; (c) passing said working fluid to a device that produces mechanical energy; and (d) passing said working fluid to a second heat exchanger.

The power cycle working fluids for the above described method may be any of the compositions as disclosed herein. In the first heat exchanger heat is absorbed by the working fluid causing it to be evaporated. The heat source may comprise any source of available heat including waste heat. Such heat sources include fuel cells, internal combustion engines (exhaust gas), internal compression engines, external combustion engines, operations at oil refineries, petrochemical plants, oil and gas pipelines, chemical industry, commercial buildings, hotels, shopping malls supermarkets, bakeries, food processing industries, restaurants, paint curing ovens, furniture making, plastics molders, cement kilns, lumber kilns (drying), calcining operations, steel industry, glass industry, foundries, smelting, air conditioning, refrigeration, and central heating.

The device for producing mechanical energy may be an expander or a turbine thus producing shaft power that can do any kind of mechanical work by employing conventional arrangements of belts, pulleys, gears, transmissions or similar devices depending on the desired speed and torque required. The shaft can be connected to an electric power-generating device such as an induction generator. The electricity produced can be used locally or delivered to the grid.

At the second heat exchanger, the working fluid is condensed and then returned to the first heat exchanger thus completing the cycle. A compressor or pump may be included in the cycle between the second heat exchanger and the first heat exchanger to elevate the pressure of the working fluid.

EXAMPLES

The concepts disclosed herein will be further described in the following examples, which do not limit the scope of the invention described in the claims.

Example 1

Cooling Performance

Cooling performance for a composition containing HFO-1234yf, HFC-32, HFC-152a, and optionally at least one saturated HFC is determined and displayed in Table 1 as compared to R-134a; R-22; R-407C; and R-404A. The pressures, discharge temperatures, COP (energy efficiency) and cooling capacity (cap) are calculated from physical property measurements for the following specific conditions (as typical for air conditioning):

| | |
|---|---|
| Evaporator temperature | −10° C. |
| Condenser temperature | 40° C. |
| Subcool amount | 6° K. |
| Return gas temperature | 18° C. |
| Compressor efficiency | 70% |

Note that the superheat is included in cooling capacity.

TABLE 1

| wt % R32 | wt % R1234yf | Wt % R152a | Ratio 1234yf/ 152a | Cap (kJ/m³) | Cap rel to R-22 | COP | COP Rel to R-22 | Disch T (° C.) | Disch P (kPa) | GWP |
|---|---|---|---|---|---|---|---|---|---|---|
| R-22 | | | | 2394 | 100% | 2.959 | 100% | 116.8 | 1532 | |
| R-407C | | | | 2368 | 99% | 2.917 | 99% | 101.6 | 1627 | |
| R-134a | | | | 1497 | 63% | 3.063 | 104% | 89.8 | 1017 | 1430 |
| 39 | 56 | 5 | 11.2 | 2724 | 114% | 2.852 | 96% | 103.9 | 1865 | 272 |
| 37 | 58 | 5 | 11.6 | 2674 | 112% | 2.858 | 97% | 102.7 | 1832 | 258 |
| 35 | 60 | 5 | 12.0 | 2622 | 110% | 2.864 | 97% | 101.5 | 1799 | 245 |
| 33 | 62 | 5 | 12.4 | 2570 | 107% | 2.871 | 97% | 100.3 | 1764 | 231 |
| 31 | 64 | 5 | 12.8 | 2517 | 105% | 2.878 | 97% | 99.0 | 1729 | 218 |
| 29 | 66 | 5 | 13.2 | 2462 | 103% | 2.885 | 97% | 97.8 | 1693 | 205 |
| 27 | 68 | 5 | 13.6 | 2406 | 101% | 2.893 | 98% | 96.6 | 1655 | 191 |
| 25 | 70 | 5 | 14.0 | 2349 | 98% | 2.901 | 98% | 95.4 | 1617 | 178 |
| 23 | 72 | 5 | 14.4 | 2291 | 96% | 2.909 | 98% | 94.1 | 1577 | 164 |
| 34 | 56 | 10 | 5.6 | 2566 | 107% | 2.880 | 97% | 102.2 | 1751 | 244 |
| 32 | 58 | 10 | 5.8 | 2516 | 105% | 2.887 | 98% | 101.0 | 1717 | 231 |
| 30 | 60 | 10 | 6.0 | 2464 | 103% | 2.894 | 98% | 99.8 | 1683 | 217 |
| 28 | 62 | 10 | 6.2 | 2411 | 101% | 2.901 | 98% | 98.5 | 1648 | 204 |
| 26 | 64 | 10 | 6.4 | 2357 | 98% | 2.909 | 98% | 97.3 | 1613 | 190 |
| 24 | 66 | 10 | 6.6 | 2302 | 96% | 2.917 | 99% | 96.1 | 1575 | 177 |
| 22 | 68 | 10 | 6.8 | 2245 | 94% | 2.929 | 99% | 94.7 | 1537 | 164 |
| 20 | 70 | 10 | 7.0 | 2187 | 91% | 2.937 | 99% | 93.5 | 1497 | 150 |
| 18 | 72 | 10 | 7.2 | 2128 | 89% | 2.946 | 100% | 92.2 | 1457 | 137 |
| 29 | 56 | 15 | 3.7 | 2410 | 101% | 2.909 | 98% | 100.5 | 1639 | 217 |
| 27 | 58 | 15 | 3.9 | 2359 | 99% | 2.916 | 99% | 99.3 | 1605 | 203 |
| 25 | 60 | 15 | 4.0 | 2306 | 96% | 2.923 | 99% | 98.1 | 1570 | 190 |
| 23 | 62 | 15 | 4.1 | 2253 | 94% | 2.931 | 99% | 96.8 | 1534 | 176 |
| 21 | 64 | 15 | 4.3 | 2198 | 92% | 2.943 | 99% | 95.5 | 1497 | 163 |
| 19 | 66 | 15 | 4.4 | 2142 | 89% | 2.951 | 100% | 94.2 | 1459 | 149 |
| 17 | 68 | 15 | 4.5 | 2084 | 87% | 2.960 | 100% | 92.9 | 1419 | 136 |
| 15 | 70 | 15 | 4.7 | 2025 | 85% | 2.968 | 100% | 91.6 | 1379 | 123 |
| 13 | 72 | 15 | 4.8 | 1965 | 82% | 2.977 | 101% | 90.3 | 1337 | 109 |
| 24 | 56 | 20 | 2.8 | 2256 | 94% | 2.937 | 99% | 98.8 | 1528 | 189 |
| 22 | 58 | 20 | 2.9 | 2204 | 92% | 2.944 | 99% | 97.6 | 1494 | 176 |
| 20 | 60 | 20 | 3.0 | 2150 | 90% | 2.956 | 100% | 96.2 | 1458 | 162 |
| 18 | 62 | 20 | 3.1 | 2096 | 88% | 2.964 | 100% | 94.9 | 1421 | 149 |
| 16 | 64 | 20 | 3.2 | 2040 | 85% | 2.972 | 100% | 93.7 | 1383 | 135 |
| 14 | 66 | 20 | 3.3 | 1982 | 83% | 2.981 | 101% | 92.4 | 1343 | 122 |
| 12 | 68 | 20 | 3.4 | 1924 | 80% | 2.990 | 101% | 91.0 | 1303 | 109 |
| 10 | 70 | 20 | 3.5 | 1863 | 78% | 2.999 | 101% | 89.7 | 1261 | 95 |
| 8 | 72 | 20 | 3.6 | 1802 | 75% | 3.008 | 102% | 88.3 | 1218 | 82 |
| wt % R-134a | | | | | | | | | | |
| 10 | 29 | 56 | 5 | 11.2 | 2445 | 102% | 2.897 | 98% | 99.1 | 1673 | 347 |
| 10 | 22 | 58 | 10 | 5.8 | 2231 | 93% | 2.934 | 99% | 96.1 | 1522 | 306 |
| 10 | 15 | 60 | 15 | 4.0 | 2016 | 84% | 2.975 | 101% | 92.9 | 1369 | 265 |
| 10 | 8 | 62 | 20 | 3.1 | 1797 | 75% | 3.012 | 102% | 89.5 | 1213 | 224 |

These data indicate that certain compositions of the present invention would serve as good replacements for existing refrigerants such as R-134a, R-22, and R-407C. Of note are compositions comprising 56-72% HFO-1234yf, 8-39% HFC-32, and 5-20% HFC-152a that exhibit cooling capacity that is 75-114% of the cooling capacity of R-22 and R-407C, energy efficiency that is up to 96-102% of the energy efficiency of R-22, and lower discharge temperatures (thus increasing compressor life). In another example, compositions comprising 56-62% HFO-1234yf, 8-29% HFC-32, and 5-20% HFC-152a, and 10% R-134a exhibit cooling capacity that is 75-102% of the cooling capacity of R-22 and R-407C and 98-102% of the energy efficiency. These compositions also exhibit lower compressor discharge temperatures. Most preferred are compositions within about +/−10% of the cooling capacity of R-22 and R-407C as they may be direct drop-in replacements.

Example 2

Cooling Performance

Cooling performance for a composition containing HFO-1234yf or trans-HFO-1234ze, HFC-32, and HFC-152a is determined and displayed in Table 2 as compared to R-134a; R-22; R-407C; and R-404A. The pressures, discharge temperatures, COP (energy efficiency) and cooling capacity (cap) are calculated from physical property measurements for the following specific conditions (as typical for air conditioning):

| | |
|---|---|
| Evaporator temperature | −10° C. |
| Condenser temperature | 40° C. |
| Subcool amount | 6° K. |
| Return gas temperature | 18° C. |
| Compressor efficiency | 70% |

Note that the superheat is included in cooling capacity.

TABLE 2

| | 32/1234/152a (wt %) | HPO/152a ratio | Cap (kJ/m³) | Cap rel to: 134a | COP | COP Rel to: 134a | Disch T (° C.) | Disch P (kPa) | GWP |
|---|---|---|---|---|---|---|---|---|---|
| R-134a | | | 1497 | 100% | 3.063 | 100% | 89.8 | 1017 | 1430 |
| 32/1234yf | 10/90 | | 1876 | 125% | 2.966 | 97% | 84.3 | 1297 | 71 |
| 32/1234yf/152a | 10/85/5 | 17.0 | 1878 | 125% | 2.975 | 97% | 85.6 | 1290 | 77 |
| 32/1234yf/152a | 10/80/10 | 8.0 | 1876 | 125% | 2.984 | 97% | 87.0 | 1282 | 83 |
| 32/1234yf/152a | 10/75/15 | 5.0 | 1871 | 125% | 2.992 | 97% | 88.3 | 1272 | 89 |
| 32/1234yf/152a | 10/30/60 | 0.5 | 1740 | 116% | 3.041 | 99% | 100.9 | 1151 | 143 |
| 32/1234yf/152a | 10/20/70 | 0.3 | 1702 | 114% | 3.049 | 100% | 103.6 | 1151 | 155 |
| 32/t-1234ze | 10/90 | | 1494 | 100% | 3.026 | 99% | 93.0 | 1038 | 73 |
| 32/t-1234ze/152a | 10/85/5 | 17.0 | 1511 | 101% | 3.030 | 99% | 94.0 | 1044 | 79 |
| 32/t-1234ze/152a | 10/80/10 | 8.0 | 1526 | 102% | 3.034 | 99% | 95.0 | 1049 | 85 |
| 32/t-1234ze/152a | 10/75/15 | 5.0 | 1540 | 103% | 3.037 | 99% | 95.9 | 1052 | 91 |
| 32/1234ze/152a | 10/30/60 | 0.5 | 1611 | 108% | 3.058 | 100% | 104.0 | 1067 | 144 |
| 32/1234ze/152a | 10/20/70 | 0.3 | 1619 | 108% | 3.061 | 100% | 105.7 | 1067 | 156 |
| | | | | R-22 | | R-22 | | | |
| R-22 | | | 2394 | 100% | 2.959 | 100% | 116.8 | 1532 | 1810 |
| R-407C | | | 2368 | 99% | 2.917 | 99% | 101.6 | 1627 | 1774 |
| 32/1234yf | 21.5/78.5 | | 2259 | 94% | 2.907 | 98% | 91.8 | 1566 | 148 |
| 32/1234yf/152a | 21.5/73.5/5 | 14.7 | 2246 | 94% | 2.92 | 99% | 93.1 | 1547 | 154 |
| 32/1234yf/152a | 21.5/68.5/10 | 6.9 | 2230 | 93% | 2.931 | 99% | 94.4 | 1527 | 160 |
| 32/1234yf/152a | 21.5/63.5/15 | 4.2 | 2212 | 92% | 2.941 | 99% | 95.8 | 1506 | 166 |
| 32/1234yf/152a | 21.5/58.5/20 | 2.9 | 2190 | 91% | 2.946 | 100% | 97.2 | 1485 | 172 |
| | | | | 404A | | 404A | | | |
| 404A | | | 2602 | 100% | 2.836 | 100% | 84.9 | 1833 | 3922 |
| 32/1234yf | 36/64 | | 2678 | 103% | 2.846 | 100% | 100.8 | 1848 | 246 |
| 32/1234yf/152a | 36/59/5 | 11.9 | 2648 | 102% | 2.861 | 101% | 102.1 | 1816 | 252 |
| 32/1234yf/152a | 36/54/10 | 5.4 | 2616 | 101% | 2.874 | 101% | 103.4 | 1783 | 258 |
| 32/1234yf/152a | 36/49/15 | 3.3 | 2580 | 99% | 2.885 | 102% | 104.8 | 1750 | 264 |
| 32/1234yf/152a | 36/44/20 | 2.2 | 2543 | 98% | 2.895 | 102% | 106.3 | 1718 | 270 |
| 32/1234yf | 42.5/57.5 | | 2846 | 109% | 2.827 | 100% | 105.7 | 1957 | 289 |
| 32/1234yf/152a | 42.5/52.5/5 | 10.5 | 2809 | 108% | 2.842 | 100% | 106.0 | 1919 | 295 |
| 32/1234yf/152a | 42.5/47.5/10 | 4.8 | 2769 | 106% | 2.855 | 101% | 107.4 | 1882 | 301 |
| 32/1234yf/152a | 42.5/42.5/15 | 2.8 | 2726 | 105% | 2.867 | 101% | 108.9 | 1844 | 307 |
| 32/1234yf/152a | 42.5/37.5/20 | 1.9 | 2681 | 103% | 2.876 | 101% | 110.3 | 1807 | 313 |
| 32/t-1234ze | 42.5/57.5 | | 2485 | 96% | 2.857 | 101% | 112.4 | 1715 | 290 |
| 32/t-1234ze/152a | 42.5/52.5/5 | 10.5 | 2478 | 95% | 2.867 | 101% | 113.2 | 1701 | 296 |
| 32/t-1234ze/152a | 42.5/47.5/10 | 4.8 | 2469 | 95% | 2.876 | 101% | 113.9 | 1686 | 302 |
| 32/t-1234ze/152a | 42.5/42.5/15 | 2.8 | 2461 | 95% | 2.884 | 102% | 114.7 | 1672 | 308 |
| 32/t-1234ze/152a | 42.5/37.5/20 | 1.9 | 2450 | 94% | 2.892 | 102% | 115.5 | 1658 | 314 |
| 32/1234yf | 57.5/42.5 | | 3200 | 123% | 2.802 | 99% | 113.7 | 2170 | 390 |
| 32/1234yf/152a | 57.5/37.5/5 | 7.5 | 3143 | 121% | 2.815 | 99% | 115.2 | 2122 | 396 |
| 32/1234yf/152a | 57.5/32.5/10 | 3.3 | 3083 | 118% | 2.825 | 100% | 116.8 | 2074 | 402 |
| 32/1234yf/152a | 57.5/27.5/15 | 1.8 | 3021 | 116% | 2.834 | 100% | 118.3 | 2027 | 408 |
| 32/1234yf/152a | 57.5/22.5/20 | 1.1 | 2961 | 114% | 2.841 | 100% | 119.9 | 1982 | 414 |
| 32/t-1234ze | 57.5/42.5 | | 2878 | 111% | 2.806 | 99% | 120.6 | 1970 | 391 |

TABLE 2-continued

| 32/1234/152a (wt %) | HPO/152a ratio | Cap (kJ/m³) | Cap rel to: | COP | COP Rel to: | Disch T (° C.) | Disch P (kPa) | GWP |
|---|---|---|---|---|---|---|---|---|
| 32/t-1234ze/152a | 57.5/37.5/5 | 8.5 | 2861 | 110% | 2.818 | 99% | 121.2 | 1948 | 397 |
| 32/t-1234ze/152a | 57.5/32.5/10 | 3.3 | 2843 | 109% | 2.829 | 100% | 121.9 | 1926 | 402 |
| 32/t-1234ze/152a | 57.5/27.5/15 | 1.8 | 2823 | 108% | 2.838 | 100% | 122.6 | 1904 | 408 |
| 32/t-1234ze/152a | 57.5/22.5/20 | 1.1 | 2803 | 108% | 2.846 | 100% | 123.3 | 1883 | 414 |

These data indicate that certain compositions of the present invention would serve as good replacements for existing refrigerants such as R-134a, R-22, R-407C, and R-404A. Of note are compositions comprising 75-85% HFO-1234yf, 10% HFC-32, and 5-15% HFC-152a that exhibit cooling capacity that is 125% of the cooling capacity of R-134a, energy efficiency that is up to 6% higher than R-134a, and lower discharge temperatures (thus increasing compressor life). In another example, compositions comprising 75-85% trans-HFO-1234ze (designated in the table as t-1234ze), 10% HFC-32, and 5-15% HFC-152a exhibit cooling capacity that is equivalent to the cooling capacity of R-134a and 7% higher energy efficiency. In another example, compositions comprising about 58-74% HFO-1234yf, about 21.5% HFC-32, and 5-20% HFC-152a exhibit cooling capacity that is from 90-95% of the cooling capacity of R-22 and R-407C, 3-4% better energy efficiency and lower discharge temperatures. Similarly, a composition comprising 44-59% HFO-1234yf, 36% HFC-32 and 5-20% HFC-152a exhibits energy efficiency and cooling capacity that is equivalent to the cooling capacity of R-404A. In another example, compositions comprising about 37-53% HFO-1234yf, about 42.5% HFC-32, and 5-20% HFC-152a exhibit cooling capacity 103-108% of the cooling capacity of R-404A, and equivalent energy efficiency. In another example, compositions comprising about 37-53% trans-HFO-1234ze, about 42.5% HFC-32, and 5-20% HFC-152a exhibit cooling capacity within 6% of the cooling capacity of R-404A, and equivalent energy efficiency. In another example, composition comprising 22-38% HFO-1234yf, 57.5% HFC-32 and 5-20% HFC-152a exhibits a cooling capacity that is 114-121% of the cooling capacity of R-404A and equivalent energy efficiency. In another example, composition comprising 22-38% trans-HFO-1234ze, 57.5% HFC-32 and 5-20% HFC-152a exhibits a cooling capacity that is 108-110% of the cooling capacity of R-404A and equivalent energy efficiency.

Example 3

The burning velocity for compositions of the present invention was determined relative to R-32 by measuring the pressure rise in a 12-liter vessel. The burning velocity of HFC-32 is 6.7 cm/s (ISO-817). Compositions were introduced at stoichiometric amounts in air into the 12-liter vessel at 25® C. and atmospheric pressure. The compositions were ignited using a fused-Nichrome wire-igniter and the time to reach a pressure of 2 atmosphere was measured. The ratio of the time for each composition relative to the time for R-32 to reach 2 atm was reported. This value was then used to estimate a burning velocity for each mixture assuming that R-32 burning velocity is 6.7 cm/s. Results are shown in Table 1 below:

TABLE 3

| R-152a (wt %) | HFO-1234yf (wt %) | R-32 (wt %) | Ratio wt % 1234yf/ wt % 152a | Time to 2 atm (s) | Ratio of time to 2 atm vs R-32 | Estimated Burning Velocity (cm/s) |
|---|---|---|---|---|---|---|
| 0.0 | 0.0 | 100.0 | #N/A | 0.297 | 1.000 | 6.7 |
| 20.0 | 22.5 | 57.5 | 1.1 | 0.150 | 1.983 | 13.3 |
| 20.0 | 44.0 | 36.0 | 2.2 | 0.153 | 1.944 | 13.0 |
| 20.0 | 37.5 | 42.5 | 1.9 | 0.157 | 1.894 | 12.7 |
| 20.0 | 58.5 | 21.5 | 2.9 | 0.200 | 1.487 | 10.0 |
| 15.0 | 27.5 | 57.5 | 1.8 | 0.220 | 1.355 | 9.1 |
| 15.0 | 42.5 | 42.5 | 2.8 | 0.224 | 1.328 | 8.9 |
| 10.0 | 47.5 | 42.5 | 4.8 | 0.315 | 0.946 | 6.3 |
| 15.0 | 49.0 | 36.0 | 3.3 | 0.342 | 0.870 | 5.8 |
| 10.0 | 32.5 | 57.5 | 3.3 | 0.352 | 0.845 | 5.7 |
| 15.0 | 63.5 | 21.5 | 4.2 | 0.394 | 0.755 | 5.1 |
| 10.0 | 54.0 | 36.0 | 5.4 | 0.406 | 0.733 | 4.9 |
| 10.0 | 68.5 | 21.5 | 6.9 | 0.562 | 0.530 | 3.5 |

TABLE 3.1

| R-152a (wt %) | HFO (wt %) | R-32 (wt %) | Ratio wt % 1234yf/ wt % 152a | Time to 2 atm (s) | Ratio of time to 2 atm vs R-32 | Estimated Burning Velocity (cm/s) |
|---|---|---|---|---|---|---|
| 20.0 See Example 3 | 37.5 (1234yf) | 42.5 | 1.9 | 0.157 | 1.894 | 12.7 |
| 20.0 | 37.5 (trans-HFO-1234ze) | 42.5 | 1.9 | 0.152 | 1.957 | 13.1 |

Results show up to about 15 wt % HFC-152a can be added to R32/HFO-1234yf and/or R32/trans-HFO-1234ze compositions and maintain a burning velocity below about 10 cm/s which would be considered 2L flammability by ASHRAE Std 34. Alternatively, the ratio of wt % of HFO-1234yf to HFC-152a in the composition was plotted versus the estimated burning velocity in FIG. 1. The graph shows the 32/152a/1234yf mixtures will have burning velocity below about 10 cm/s if the ratio of HFO-1234yf/HFC-152 is at least about 2.8.

Example 4

Global Warming Potentials

Values for global warming potential (GWP) for some of the disclosed compositions are listed in Table 4 as compared to GWP values for existing refrigerants such as R-22, HFC-134a, R-404A, and R-407C. The GWP for the pure components are listed for reference. The GWP values for compositions containing more than one component are calculated as weighted averages of the individual component GWP values. The values for the HFCs are taken from the "Climate Change 2007—IPCC (Intergovernmental Panel on Climate Change) Fourth Assessment Report on Climate Change", from the section entitled "Working Group 1 Report: "The Physical Science Basis", Chapter 2, pp. 212-213, Table 2.14. The value for HFO-1234yf was published in Papadimitriou et al., *Physical Chemistry Chemical Physics*, 2007, vol. 9, pp. 1-13. Specifically, the 100 year time horizon GWP values are used. The value for trans-HFO-1234ze was presented by Higashi at the 2010 International Symposium on Next-generation Air Conditioning and Refrigeration Technology, Feb. 17-19, 2010, Tokyo, Japan.

TABLE 4

| Component or Composition | GWP |
|---|---|
| R-22 | 1810 |
| HFC-134a | 1430 |
| R-404A | 3922 |
| R-407C | 3985 |
| HFC-32 | 675 |
| HFC-152a | 124 |
| HFO-1234yf | 4 |
| trans-HFO-1234ze | 6 |
| HFO-1234yf/HFC-32/HFC-152a (85/10/5 wt %) | 77 |
| HFO-1234yf/HFC-32/HFC-152a (80/10/10 wt %) | 83 |
| HFO-1234yf/HFC-32/HFC-152a (75/10/15 wt %) | 89 |
| trans-HFO-1234ze/HFC-32/HFC-152a (85/10/5 wt %) | 79 |
| trans-HFO-1234ze/HFC-32/HFC-152a (80/10/10 wt %) | 85 |
| trans-HFO-1234ze/HFC-32/HFC-152a (75/10/15 wt %) | 91 |
| HFO-1234yf/HFC-32/HFC-152a (73.5/21.5/5 wt %) | 154 |
| HFO-1234yf/HFC-32/HFC-152a (68.5/21.5/10 wt %) | 160 |
| HFO-1234yf/HFC-32/HFC-152a (63.5/21.5/15 wt %) | 166 |
| trans-HFO-1234ze /HFC-32/HFC-152a (73.55/21.5/5 wt %) | 156 |
| trans-HFO-1234ze /HFC-32/HFC-152a (68.5/21.5/10 wt %) | 162 |
| trans-HFO-1234ze /HFC-32/HFC-152a (63.5/21.5/15 wt %) | 168 |

TABLE 4-continued

| Component or Composition | GWP |
|---|---|
| HFO-1234yf/HFC-32/HFC-152a (59/36/5 wt %) | 252 |
| trans-HFO-1234ze/HFC-32/HFC-152a (59/36/5 wt %) | 253 |
| HFO-1234yf/HFC-32/HFC-152a (37.5/57.5/5 wt %) | 396 |
| HFO-1234yf/HFC-32/HFC-152a (32.5/57.5/10 wt %) | 402 |
| HFO-1234yf/HFC-32/HFC-152a (27.5/57.5/15 wt %) | 408 |
| trans-HFO-1234ze/HFC-32/HFC-152a (37.5/57.5/5 wt %) | 396 |
| trans-HFO-1234ze/HFC-32/HFC-152a (32.5/57.5/10 wt %) | 402 |
| trans-HFO-1234ze/HFC-32/HFC-152a (27.5/57.5/15 wt %) | 408 |

Many compositions as disclosed herein provide significantly lower GWP alternatives to existing refrigerants such as R-22, R-404A, R-407C, and HFC-134a. Also, many of the compositions of the present invention provide lower GWP than pure HFC-32 while some provide lower GWP than even pure HFC-152a.

Example 5

Cooling Performance

Cooling performance for a composition containing HFO-1234yf, HFC-32, HFC-152 and/or HFO-1243zf, and optionally at least one saturated HFC is determined and displayed in Table 5 as compared to R-134a; R-22; R-407C; and R-404A. The pressures, discharge temperatures, COP (energy efficiency) and cooling capacity (cap) are calculated from physical property measurements for the following specific conditions (as typical for air conditioning):

| Evaporator temperature | −10° C. |
|---|---|
| Condenser temperature | 40° C. |
| Subcool amount | 6° K. |
| Return gas temperature | 18° C. |
| Compressor efficiency | 70% |

Note that the superheat is included in cooling capacity.

| wt % R32 | wt % R1234yf | Wt % R152a | Wt % 1243zf | Ratio 1234yf/(152a+1243zf) | Cap (kJ/m³) | Cap rel to R-22 | COP | COP Rel to R-22 | Disch T (C) | Disch P (kPa) | GWP |
|---|---|---|---|---|---|---|---|---|---|---|---|
| R-22 | | | | | 2394 | 100% | 2.959 | 100% | 116.8 | 1532 | 1810 |
| R-407C | | | | | 2368 | 99% | 2.917 | 99% | 101.6 | 1627 | 1774 |
| R-134a | | | | | 1497 | 63% | 3.063 | 104% | 89.8 | 1017 | 1430 |
| 39 | 56 | 0 | 5 | 11.2 | 2714 | 113% | 2.846 | 96% | 103.2 | 1865 | 266 |
| 37 | 58 | 2.5 | 2.5 | 11.6 | 2669 | 111% | 2.855 | 96% | 102.3 | 1832 | 255 |
| 31 | 64 | 0 | 5 | 12.8 | 2504 | 105% | 2.872 | 97% | 98.3 | 1727 | 212 |
| 29 | 66 | 2.5 | 2.5 | 13.2 | 2456 | 103% | 2.883 | 97% | 97.4 | 1692 | 202 |
| 25 | 70 | 0 | 5 | 14.0 | 2334 | 97% | 2.895 | 98% | 94.6 | 1613 | 172 |
| 23 | 72 | 2.5 | 2.5 | 14.4 | 2283 | 95% | 2.911 | 98% | 93.7 | 1575 | 161 |
| 34 | 56 | 0 | 10 | 5.6 | 2547 | 106% | 2.870 | 97% | 100.7 | 1750 | 232 |
| 32 | 58 | 5 | 5 | 5.8 | 2506 | 105% | 2.882 | 97% | 100.2 | 1717 | 225 |
| 26 | 64 | 0 | 10 | 6.4 | 2332 | 97% | 2.899 | 98% | 95.7 | 1607 | 179 |
| 24 | 66 | 5 | 5 | 6.6 | 2289 | 96% | 2.912 | 98% | 95.3 | 1572 | 171 |
| 20 | 70 | 0 | 10 | 7.0 | 2157 | 90% | 2.927 | 99% | 91.9 | 1488 | 138 |
| 18 | 72 | 5 | 5 | 7.2 | 2113 | 88% | 2.941 | 99% | 91.4 | 1452 | 131 |
| 29 | 56 | 0 | 15 | 3.7 | 2383 | 100% | 2.895 | 98% | 98.2 | 1635 | 199 |
| 27 | 58 | 7.5 | 7.5 | 3.9 | 2346 | 98% | 2.909 | 98% | 98.1 | 1603 | 194 |
| 21 | 64 | 0 | 15 | 4.3 | 2160 | 90% | 2.929 | 99% | 93.0 | 1486 | 145 |
| 19 | 66 | 7.5 | 7.5 | 4.4 | 2123 | 89% | 2.944 | 99% | 93.0 | 1453 | 141 |
| 15 | 70 | 0 | 15 | 4.7 | 1980 | 83% | 2.954 | 100% | 89.1 | 1362 | 105 |
| 13 | 72 | 7.5 | 7.5 | 4.8 | 1942 | 81% | 2.971 | 100% | 89.1 | 1328 | 100 |

| wt % R32 | wt % R1234yf | Wt % R152a | Wt % 1243zf | Ratio 1234yf/ (152a+1243zf) | Cap (kJ/m³) | Cap rel to R-22 | COP | COP Rel to R-22 | Disch T (C) | Disch P (kPa) | GWP |
|---|---|---|---|---|---|---|---|---|---|---|---|
| 24 | 56 | 0 | 20 | 2.8 | 2218 | 93% | 2.919 | 99% | 95.5 | 1521 | 165 |
| 20 | 60 | 20 |  | 3.0 | 2131 | 89% | 2.948 | 100% | 94.6 | 1453 | 162 |
| 18 | 62 | 0 | 20 | 3.1 | 2047 | 86% | 2.946 | 100% | 91.6 | 1406 | 125 |
| 16 | 64 | 10 | 10 | 3.2 | 2017 | 84% | 2.964 | 100% | 92.0 | 1375 | 123 |
| 14 | 66 | 0 | 20 | 3.3 | 1927 | 80% | 2.964 | 100% | 88.9 | 1323 | 98 |
| 12 | 68 | 10 | 10 | 3.4 | 1897 | 79% | 2.982 | 101% | 89.3 | 1292 | 97 | wt % R-134a

| wt % R-134a | wt % R32 | wt % R1234yf | Wt % R152a | Wt % 1243zf | Ratio 1234yf/ (152a+1243zf) | Cap (kJ/m³) | Cap rel to R-22 | COP | COP Rel to R-22 | Disch T (C) | Disch P (kPa) | GWP |
|---|---|---|---|---|---|---|---|---|---|---|---|---|
| 10 | 29 | 56 | 0 | 5 | 11.2 | 2436 | 102% | 2.892 | 98% | 98.3 | 1672 | 341 |
| 10 | 22 | 58 | 5 | 5 | 5.8 | 2222 | 93% | 2.933 | 99% | 95.1 | 1520 | 300 |
| 10 | 15 | 60 | 0 | 15 | 4.0 | 1981 | 83% | 2.962 | 100% | 90.2 | 1358 | 247 |
| 10 | 8 | 62 | 10 | 10 | 3.1 | 1774 | 74% | 3.006 | 102% | 87.6 | 1203 | 212 |

These data indicate that certain compositions of the present invention would serve as good replacements for existing refrigerants such as R-134a, R-22, and R-407C. Of note are compositions comprising 56-72% HFO-1234yf, 12-39% HFC-32, and 0-20% HFC-152a and 0-20% HFO-1243zf that exhibit cooling capacity that is 79-113% of the cooling capacity of R-22 and R-407C, energy efficiency that is up to 96-101% of the energy efficiency of R-22 and R-407C, and lower discharge temperatures (thus increasing compressor life). In another example, compositions comprising 56-62% HFO-1234yf, 8-29% HFC-32, and 0-10% HFC-152a, 0-15% HFO-1243zf, and 10% R-134a exhibit cooling capacity that is 74-102% of the cooling capacity of R-22 and R-407C and 98-102% of the energy efficiency. These compositions also exhibit lower compressor discharge temperatures. Most preferred are compositions within about +/−10% of the cooling capacity of R-22 and R-407C as they may be direct drop-in replacements.

SELECTED EMBODIMENTS

Embodiment A-I

A composition comprising HFO-1234yf or trans-HFO-1234ze or a mixture thereof; HFC-32; and HFC-152a, HFO-1243zf or mixture thereof; wherein said HFO-1234yf or trans-HFO-1234ze or a mixture thereof is at least 56 weight percent of the total weight of said composition.

Embodiment A-II

A composition comprising HFO-1234yf or trans-HFO-1234ze or a mixture thereof; HFC-32; and HFC-152a, HFO-1243zf or mixture thereof; wherein said HFC-32 is at most 29 weight percent of the total weight of said composition;

Embodiment A-III

A composition comprising HFO-1234yf or trans-HFO-1234ze or a mixture thereof; HFC-32; and HFC-152a, HFO-1243zf or mixture thereof; wherein said HFC-152a, HFO-1243zf or mixture thereof is at least 56 weight percent of the total weight of said composition.

Embodiment A-IV

A composition comprising HFO-1234yf or trans-HFO-1234ze or a mixture thereof; HFC-32; and HFC-152a, HFO-1243zf or mixture thereof; wherein said HFC-32 is at least 56 weight percent of the total weight of said composition.

Embodiment A-V

A composition comprising HFO-1234yf or trans-HFO-1234ze or a mixture thereof; HFC-32; and HFC-152a, HFO-1243zf or mixture thereof, wherein said composition comprises trans-HFO-1234ze; HFC-32; and HFC-152a, HFO-1243zf or mixture thereof.

Embodiment A-VI

A composition comprising HFO-1234yf or trans-HFO-1234ze or a mixture thereof; HFC-32; and HFC-152a, HFO-1243zf or mixture thereof; wherein said HFO-1243zf or mixture thereof with HFC-152a is at most 20 weight percent of the total weight of said composition.

Embodiment B-I

The composition as recited in any of Embodiments A-I to A-VI, wherein said composition has a cooling capacity in the range of from about 75% to about 130% of at least one existing refrigerant.

Embodiment B-II

The composition as recited in any of Embodiments A-I to A-VI, wherein said composition has a cooling capacity in the range of from about 80% to about 120% of at least one existing refrigerant.

Embodiment B-III

The composition as recited in any of Embodiments A-I to A-VI, wherein said composition has a cooling capacity in the range of from about 90% to about 110% of at least one existing refrigerant.

Embodiment B-IV

The composition as recited in any of Embodiments A-I to A-VI or B-I to B-III, wherein said existing refrigerant is selected from the group consisting of R-22, HFC-134a, R-404A, and R-407C.

Embodiment B-V

The composition as recited in any of Embodiments A-I to A-VI or B-I to B-IV, wherein the flammability of said composition is classified at most as 2L.

Embodiment C-I

The composition as recited in any of Embodiments A-I, A-II, A-V, A-VI or B-I to B-V, comprising from about 56 to about 98 weight percent HFO-1234yf or trans-HFO-1234ze or a mixture thereof; about 1-29 weight percent HFC-32; and from about 1 to about 18 weight percent HFC-152a, HFO-1243zf or mixture thereof.

Embodiment C-II

The composition as recited in any of Embodiments A-I, A-II, A-V, A-VI or B-I to B-V, comprising from about 60 to about 98 weight percent HFO-1234yf or trans-HFO-1234ze or a mixture thereof; about 5-25 weight percent HFC-32; and from about 5 to about 15 weight percent HFC-152a, HFO-1243zf or mixture thereof.

Embodiment C-III

The composition as recited in any of Embodiments A-I, A-II, A-V, A-VI or B-I to B-V, comprising from about 75 to about 85 weight percent HFO-1234yf or trans-HFO-1234ze or a mixture thereof; about 10 weight percent HFC-32; and from about 5 to about 15 weight percent HFC-152a, HFO-1243zf or mixture thereof.

Embodiment C-IV

The composition as recited in any of Embodiments A-I, A-II, A-V, A-VI or B-I to B-V, comprising from about 58 to about 73.5 weight percent HFO-1234yf or trans-HFO-1234ze or a mixture thereof; about 21.5 weight percent HFC-32; and from about 5 to about 20 weight percent HFC-152a, HFO-1243zf or mixture thereof.

Embodiment C-V

The compositions as recited in any of Embodiments A-I, A-II, A-V, A-VI or B-I to B-V comprising from about 56 to about 98 weight percent HFO-1234yf or HFO-1234ze or a mixture thereof; from about 1 to about 43 weight percent HFC-32; and from about 1 to about 18 weight percent HFC-152a, HFO-1243zf or mixture thereof.

Embodiment C-VI

The compositions as recited in any of Embodiments A-I, A-V, A-VI or B-I to B-V comprising from about 56 to about 98 weight percent HFO-1234yf or HFO-1234ze or a mixture thereof; from about 1 to about 43 weight percent HFC-32; and from about 1 to about 15 weight percent HFC-152a, HFO-1243zf or mixture thereof.

Embodiment C-VII

The compositions as recited in any of Embodiments A-I, A-V, A-VI or B-I to B-V comprising from about 56 to about 98 weight percent trans-HFO-1234ze; from about 1 to about 43 weight percent HFC-32; and from about 1 to about 20 weight percent HFC-152a, HFO-1243zf or mixture thereof.

Embodiment C-VIII

The composition as recited in any of Embodiments A-IV, A-V, A-VI or B-I to B-V, comprising from about 22 to about 38 weight percent HFO-1234yf or trans-HFO-1234ze or a mixture thereof; about 57.5 weight percent HFC-32; and from about 5 to about 20 weight percent HFC-152a, HFO-1243zf or mixture thereof.

Embodiment D-I

The composition as recited in any of Embodiments A-I to A-VI, B-I to B-V or C-I to C-VIII, further comprising at least one saturated HFC in the range of from greater than 0 weight percent to about 10 weight percent.

Embodiment D-II

The composition as recited in Embodiment D-I, wherein said at least one saturated HFC is HFC-134a.

Embodiment D-III

The composition as recited in any of Embodiments A-I to A-VI, B-I to B-V, C-I to C-VIII, or D-I to D-II, wherein the GWP of said composition is less than the GWP of at least one refrigerant selected from the group consisting of R-134a, R-22, R-407C, and R-404A.

Embodiment D-IV

The composition as recited in any of Embodiments A-I to A-VI, B-I to B-V, C-I to C-VIII, or D-I to D-III, wherein the ratio of said HFO-1234yf, trans-HFO-1234ze or a mixture thereof to HFC-152a, HFO-1243zf or mixture thereof is in the range of from about 1:1 to about 20:1.

Embodiment D-V

The composition as recited in any of Embodiments A-I to A-VI, B-I to B-V, C-I to C-VIII, or D-I to D-IV, further comprising at least one lubricant selected from the group consisting of mineral oils, alkylbenzenes, synthetic paraffins, synthetic naphthenes, poly alpha olefins, polyalkylene glycols, dibasic acid esters, polyesters, neopentyl esters, polyvinyl ethers, silicones, silicate esters, fluorinated compounds, phosphate esters and mixtures thereof.

Embodiment D-VI

The composition as recited in any of Embodiments A-I to A-VI, B-I to B-V, C-I to C-VIII, or D-I to D-V, further comprising at least one additive selected from the group consisting of lubricants, dyes (including UV dyes), solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof.

Embodiment E-I

A process to produce cooling comprising condensing the composition of any of Embodiments A-I to A-VI, B-I to B-V, C-I to C-VIII, or D-I to D-IV and thereafter evaporating said composition in the vicinity of a body to be cooled.

Embodiment E-II

A process to produce heat comprising condensing the composition of any of Embodiments A-I to A-VI, B-I to B-V, C-I to C-VIII, or D-I to D-IV in the vicinity of a body to be heated and thereafter evaporating said composition.

Embodiment E-III

A method for replacing existing refrigerants, in a system suitable for use with said existing refrigerants, respectively, wherein said method comprises providing the composition of any of Embodiments A-I to A-VI, B-I to B-V, C-I to C-VIII, or D-I to D-IV to said system.

Embodiment E-IV

A method for replacing existing refrigerants, in a system designed to use said existing refrigerants, respectively, wherein said method comprises providing the composition of any of Embodiments A-I to A-VI, B-I to B-V, C-I to C-VIII, or D-I to D-IV to said system.

Embodiment E-V

The method as recited in Embodiment E-IV, wherein said existing refrigerants are selected from R-22, R-404A, R-407C, and R-134a.

Embodiment E-VI

Use of any of Embodiments A-I to A-VI, B-I to B-III, B-V, or C-I to C-VIII as a replacement for R-22.

Embodiment E-VII

Use of any of Embodiments A-I to A-VI, B-I to B-III, B-V, or C-I to C-VIII as a replacement for R407.

Embodiment E-VIII

Use of any of Embodiments A-I to A-VI, B-I to B-III, B-V, or C-I to C-VIII as a replacement for R-404A.

Embodiment E-IX

Use of any of Embodiments A-I to A-VI, B-I to B-III, B-V, or C-I to C-VIII as a replacement for R-134a.

Embodiment F-I

A refrigeration, air-conditioning or heat pump apparatus containing the composition of any of Embodiments A-I to A-VI, B-I to B-V, C-I to C-VIII, or D-I to D-IV.

Embodiment F-II

A stationary air conditioning apparatus containing the composition of any of Embodiments A-I to A-VI, B-I to B-V, C-I to C-VIII, or D-I to D-IV.

Embodiment F-III

A stationary refrigeration system containing the composition of any of Embodiments A-I to A-VI, B-I to B-V, C-I to C-VIII, or D-I to D-IV.

Embodiment F-IV

An automotive air conditioner or heat pump containing the composition of any of Embodiments A-I to A-VI, B-I to B-V, C-I to C-VIII, or D-I to D-IV.

Embodiment F-V

The use of the composition of any of Embodiments A-I to A-VI, B-I to B-V, C-I to C-VIII, or D-I to D-IV as a power cycle working fluid.

Embodiment F-VI

A process for recovering heat which comprises: (a) passing a working fluid comprising a composition of any of Embodiments A-I to A-VI, B-I to B-V, C-I to C-VIII, or D-I to D-IV through a first heat exchanger in communication with a process which produces heat; (b) removing said working fluid from said first heat exchanger; (c) passing said working fluid to a device that produces mechanical energy; and (d) passing said working fluid to a second heat exchanger.

Embodiment F-VII

Use of the composition of any of Embodiments A-I to A-VI, B-I to B-V, C-I to C-VIII, or D-I to D-IV as a refrigerant in a refrigeration, air conditioning or heat pump system.

Embodiment F-VIII

Use of the composition of any of Embodiments A-I to A-VI, B-I to B-V, C-I to C-VIII, or D-I to D-IV as a refrigerant in a stationary air conditioning system.

Embodiment F-IX

Use of the composition of any of Embodiments A-I to A-VI, B-I to B-V, C-I to C-VIII, or D-I to D-IV as a refrigerant in a stationary refrigeration system.

Embodiment F-X

Use of the composition of any of Embodiments A-I to A-VI, B-I to B-V, C-I to C-VIII, or D-I to D-IV as a refrigerant in a mobile air conditioning system.

Embodiment F-XI

Use of the composition of any of Embodiments A-I to A-VI, B-I to B-V, C-I to C-VIII, or D-I to D-IV as a refrigerant in an automobile air conditioning or heat pump system.

Embodiment F-XII

Use of the composition of any of Embodiments A-I to A-VI, B-I to B-V, C-I to C-VIII, or D-I to D-IV as a refrigerant in a chiller.

Embodiment F-XIII

Use of the composition of any of Embodiments A-I to A-VI, B-I to B-V, C-I to C-VIII, or D-I to D-IV as a refrigerant in a centrifugal chiller.

Embodiment G-I

A composition comprising HFO-1234yf or trans-HFO-1234ze or a mixture thereof; HFC-32; and HFC-152a, HFO-1243zf or mixture thereof; wherein the HFC-152a, HFO-1243zf or mixture thereof is in the range of from about 14 weight percent to about 16 weight percent, and wherein said composition has a cooling capacity in the range of from about 75% to about 130% of at least one refrigerant selected from the group consisting of R-22, HFC-134a, R-404A, and R-407C.

Embodiment G-II

The composition as recited in Embodiment G-I, further comprising at least one lubricant selected from the group consisting of mineral oils, alkylbenzenes, synthetic paraffins, synthetic naphthenes, poly alpha olefins, polyalkylene glycols, dibasic acid esters, polyesters, neopentyl esters, polyvinyl ethers, silicones, silicate esters, fluorinated compounds, phosphate esters and mixtures thereof.

Embodiment G-III

The composition as recited in any of Embodiments G-I to G-II, further comprising at least one additive selected from the group consisting of lubricants, dyes (including UV dyes), solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof.

Embodiment G-IV

A process to produce cooling comprising condensing the composition of Embodiment G-I and thereafter evaporating said composition in the vicinity of a body to be cooled.

Embodiment G-V

A process to produce heat comprising condensing the composition of Embodiment G-I in the vicinity of a body to be heated and thereafter evaporating said composition.

Embodiment G-VI

A refrigeration, air-conditioning or heat pump apparatus containing the composition of any of Embodiments G-I to G-III.

Embodiment G-VII

A stationary air conditioning apparatus containing the composition of any of Embodiments G-I to G-III.

Embodiment G-VIII

A stationary refrigeration system containing the composition of any of Embodiments G-I to G-III.

Embodiment G-IX

An automotive air conditioner or heat pump containing the composition of any of Embodiments G-I to G-III.

Embodiment G-X

The use of the composition of any of Embodiments G-I to G-III as a power cycle working fluid.

Embodiment G-XI

A process for recovering heat which comprises: (a) passing a working fluid comprising a composition of Embodiments G-I to G-III through a first heat exchanger in communication with a process which produces heat; (b) removing said working fluid from said first heat exchanger; (c) passing said working fluid to a device that produces mechanical energy; and (d) passing said working fluid to a second heat exchanger.

Embodiment H-I

A method for replacing R-22, R-404A, R-407C, or R-134a, in a system designed to use R-22, R-404A, R-407C, or R-134a, respectively, wherein said method comprises providing the composition of any of Embodiments A-I to A-VI, B-I to B-V, C-I to C-VIII, or D-I to D-IV to said system.

What is claimed is:

1. A composition consisting essentially of a refrigerant consisting of about 83 weight percent trans-HFO-1234ze, about 12 weight percent HFC-32 and about 5 weight percent HFC-152a; and optionally at least one lubricant selected from the group consisting of mineral oils, alkylbenzenes, synthetic paraffins, synthetic naphthenes, poly alpha olefins, polyalkylene glycols, dibasic acid esters, polyesters, neopentyl esters, polyvinyl ethers, silicones, silicate esters, fluorinated compounds, phosphate esters and mixtures thereof; and optionally at least one additive selected from the group consisting of UV dyes, solubilizing agents, compatibilizers, stabilizers, tracers, perfluoropolyethers, anti-wear agents, extreme pressure agents, corrosion and oxidation inhibitors, metal surface energy reducers, metal surface deactivators, free radical scavengers, foam control agents, viscosity index improvers, pour point depressants, detergents, viscosity adjusters, and mixtures thereof.

2. The composition as recited in claim 1, wherein said composition has a cooling capacity in the range of from about 75% to about 130% of at least one existing refrigerant.

3. The composition as recited in claim 2, wherein said existing refrigerant is selected from the group consisting of R-22, HFC-134a, R-404A, and R-407C.

4. The composition as recited in claim 1, wherein the flammability of said composition is classified at most as 2L.

5. The composition as recited in claim 1, wherein the GWP of said composition is less than the GWP of at least one refrigerant selected from the group consisting of R-134a, R-22, R-407C, and R-404A.

6. A process to produce cooling comprising condensing the composition of claim 1, and thereafter evaporating said composition in the vicinity of a body to be cooled.

7. A process to produce heat comprising condensing the composition of claim 1, in the vicinity of a body to be heated and thereafter evaporating said composition.

8. A method for replacing existing refrigerants, in a system designed to use said existing refrigerants, respectively, wherein said method comprises providing the composition of claim 1 to said system.

9. The method as recited in claim 8, wherein said existing refrigerants are selected from R-22, R-404A, R-407C, and R-134a.

10. A refrigeration, air-conditioning or heat pump apparatus containing the composition of claim 1.

11. A stationary air conditioning apparatus containing the composition of claim 1.

12. A stationary refrigeration system containing the composition of claim 1.

13. A process for recovering heat which comprises: (a) passing a working fluid comprising a composition of claim 1 through a first heat exchanger in communication with a process which produces heat; (b) removing said working fluid from said first heat exchanger; (c) passing said working fluid to a device that produces mechanical energy; and (d) passing said working fluid to a second heat exchanger.

14. An automotive air conditioner or heat pump containing the composition of claim 1.

15. A method for replacing R-22, R-404A, R-407C, or R-134a, in a system designed to use R-22, R-404A, R-407C, or R-134a, respectively, wherein said method comprises providing the composition of claim 1 to said system.

* * * * *